(12) United States Patent
Shtaif et al.

(10) Patent No.: US 11,082,134 B2
(45) Date of Patent: Aug. 3, 2021

(54) KRAMERS-KRONIG RECEIVER

(71) Applicant: RAMOT AT TEL AVIV UNIVERSITY, Tel Aviv (IL)

(72) Inventors: Mark Shtaif, Even Yehuda (IL); Antonio Mecozzi, L'aquila (IT); Cristian Antonelli, Sulmona (IT)

(73) Assignee: RAMOT AT TEL-AVIV UNIVERSITY LTD., Tel Aviv (IL)

( * ) Notice: Subject to any disclaimer, the term of this patent is extended or adjusted under 35 U.S.C. 154(b) by 0 days.

(21) Appl. No.: 16/948,504

(22) Filed: Sep. 21, 2020

(65) Prior Publication Data
US 2021/0111809 A1    Apr. 15, 2021

Related U.S. Application Data

(63) Continuation of application No. 16/308,997, filed as application No. PCT/IL2017/050641 on Jun. 8, 2017, now Pat. No. 10,797,800.

(60) Provisional application No. 62/470,436, filed on Mar. 13, 2017, provisional application No. 62/347,105, filed on Jun. 8, 2016.

(51) Int. Cl.
| H04B 10/06 | (2006.01) |
| H04B 10/61 | (2013.01) |
| H04L 27/38 | (2006.01) |
| H04J 14/06 | (2006.01) |
| H04B 10/69 | (2013.01) |

(52) U.S. Cl.
CPC ......... *H04B 10/614* (2013.01); *H04B 10/616* (2013.01); *H04B 10/69* (2013.01); *H04J 14/06* (2013.01); *H04L 27/38* (2013.01)

(58) Field of Classification Search
CPC ............... H04B 10/614; H04B 10/616; H04B 10/6161; H04B 10/40; H04B 10/69; H04B 10/60; H04B 10/532; H04B 10/66; H04B 10/64; H04B 10/6166; H04J 14/06
USPC ....... 398/202, 204, 205, 207, 208, 209, 210, 398/211, 213, 214, 135, 136, 158, 159, 398/183, 184, 188, 65, 152
See application file for complete search history.

(56) References Cited

U.S. PATENT DOCUMENTS

| 2014/0356003 A1* | 12/2014 | Randel | H04B 10/616 398/210 |
| 2014/0376929 A1* | 12/2014 | Takechi | H04B 10/6151 398/212 |

* cited by examiner

*Primary Examiner* — Hanh Phan
(74) *Attorney, Agent, or Firm* — Reches Patent

(57) ABSTRACT

There is provided a Kramers-Kronig receiver, comprising a reception path; wherein the reception path comprises: a Stokes receiver that is configured to receive a polarization-multiplexed signal and to output a Stokes vector; wherein the polarization-multiplexed signal comprises a first modulated signal, a second modulated signal and a continuous wave signal; wherein the first modulated signal is of a first polarization; wherein the second modulated signal is of a second polarization; wherein the continuous wave signal is of the first modulation or of the second modulation; a set of analog to digital converters that are configured to generate a digital representation of the Stokes vector; and a digital processor that is configured to process the digital representation of the Stokes vector to provide a reconstructed polarization-multiplexed signal, wherein the processing is based on a Kramers-Kronig relationship related to the polarization-multiplexed signal.

10 Claims, 16 Drawing Sheets

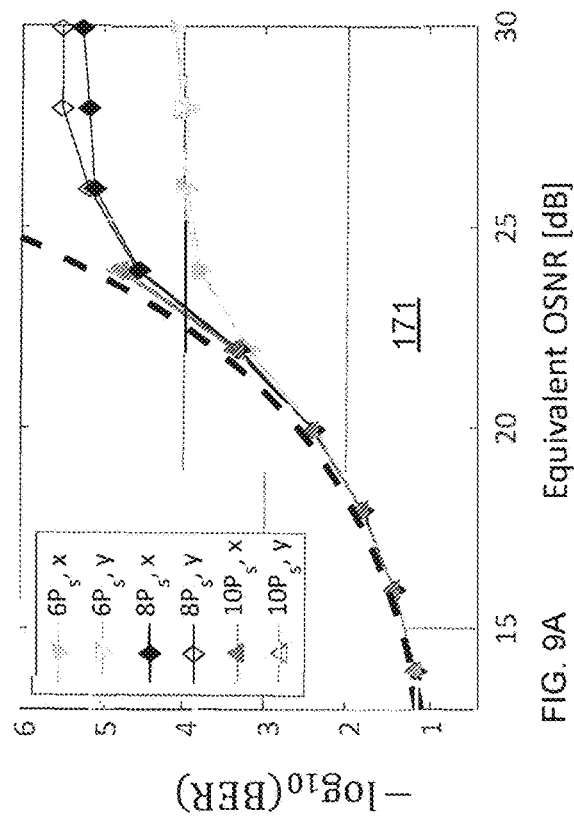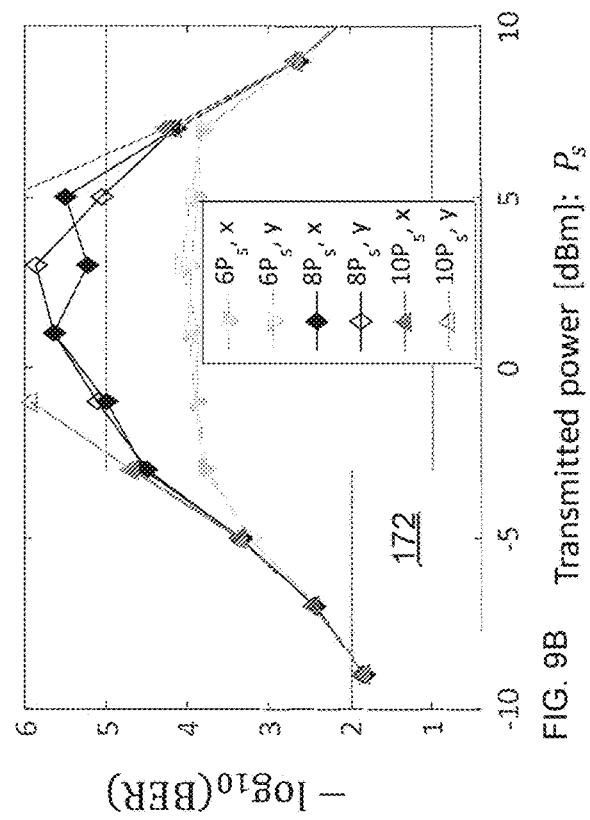
FIG. 9A
FIG. 9B

KRAMERS-KRONIG RECEIVER

CROSS REFERENCE

This application is a continuation of Ser. No. 16/308,997, filed Dec. 11, 2018, which is a U.S. National Stage of PCT/IL2017/050641, filed Jun. 8, 2017, which claims priority from U.S. provisional patent Ser. No. 62/347,105 filing date Jun. 8, 2016 and from U.S. provisional patent Ser. No. 62/470,436, filing date Mar. 13, 2017, all of which are incorporated herein in their entirety.

BACKGROUND

The interest for short-reach links of the kind needed for inter-data center communications has fueled in recent years the search for transmission schemes that are simultaneously highly performing and cost effective.

Coherent optical transmission schemes are optimal from the standpoint of spectral efficiency as they allow the encoding of information in both quadratures and polarizations of the electric field. However, while they constitute the solution of choice for medium-to-long reach applications, the cost of a coherent receiver is a major obstacle in the case of short-reach links, whose role in many areas of applications is becoming increasingly important. Indeed, coherent receivers used today are based on the intradyne scheme, which requires two optical hybrids and four pairs of balanced photodiodes, making its overall cost unacceptably high for short links, such as those intended for inter-data center communications.

SUMMARY

There may be provided a Kramers-Kronig receiver that may include a reception path. The reception path may include (i) a photodiode that may be configured to receive a received signal and output a photocurrent that represents the received signal; wherein the received signal may include a continuous wave (CW) signal and a modulated signal; wherein a frequency gap between the CW signal and the modulated signal may be smaller than a bandwidth of the modulated signal; (ii) an analog to digital converter that may be configured to generate a digital representation of the photocurrent; and (iii) a digital processor that may be configured to process the digital representation of the photocurrent to provide a reconstructed modulated signal, wherein the processing may be based on a Kramers-Kronig relationship related to the received signal.

The Kramers-Kronig relationship related to the received signal may be a relationship between a phase and an amplitude of the field of the received signal.

The digital processor may be configured to up-sample the digital representation of the photocurrent to provide an up-sampled digital signal.

The digital processor may be configured to calculate a logarithm of the up-sampled digital signal.

The digital processor may be configured to apply a Hilbert transform on the logarithm of the up-sampled digital signal to provide a Hilbert transformed signal.

The digital processor may be configured to calculate a reconstructed phase of the received signal based on the Hilbert transformed signal.

The digital processor may be configured to calculate the reconstructed modulated signal based on the reconstructed phase of the received signal.

The reception path may consist essentially of the photodiode, the analog to digital converter and the digital processor.

The reception path may consist of the photodiode, the analog to digital converter and the digital processor.

The bandwidth of the analog to digital converter may be not smaller than a bandwidth of the received signal and may be smaller than twice the bandwidth of the received signal.

The bandwidth of the analog to digital converter may be not smaller than twice a bandwidth of the received signal.

The digital processor may be configured to process the digital representation of the photocurrent without performing a logarithm operation.

The Kramers-Kronig relationship related to the received signal may be a relationship between a real part and an imaginary part of a frequency shifted version of the field of the received signal.

The digital processor may be configured to calculate in an iterative manner the real part and the imaginary part of the frequency shifted version of the field of the received signal.

The digital processor may be configured to process the digital representation of the photocurrent without up-sampling.

The reception path does not include a local oscillator.

The reception path may include a local oscillator that may be configured to output the continuous wave signal; and an adder that may be configured to add the continuous wave signal to the modulated signal to provide the received signal.

There may be provided a Kramers-Kronig receiver that may include a reception path; wherein the reception path may include (i) a polarization demultiplexing circuit that may be configured to receive a polarization-multiplexed signal and to output a first polarization component of the polarization-multiplexed signal and a second polarization component of the polarization-multiplexed signal; (ii) a first photodiode that may be configured to receive a first intermediate signal that may include a first continuous wave signal and the first polarization component, and output a first photocurrent that represents the first intermediate signal; wherein a first frequency gap between the first continuous wave and the first intermediate signal does not exceed a bandwidth of the first intermediate signal; (ii) a second photodiode that may be configured to receive a second intermediate signal that may include a second continuous wave signal and the second polarization component, and output a second photocurrent that represents the second intermediate signal; wherein a second frequency gap between the second continuous wave and the second intermediate signal does not exceed a bandwidth of the second intermediate signal; (iii) a first analog to digital converter that may be configured to generate a digital representation of the first photocurrent; (iv) a second analog to digital converter that may be configured to generate a digital representation of the second photocurrent; and (v) a digital processor that may be configured to process the digital representation of the first photocurrent and the digital representation of the second photocurrent to provide a reconstructed polarization-multiplexed signal, wherein the processing may be based on one or more Kramers-Kronig relationships related to the polarization-multiplexed signal.

The one or more Kramers-Kronig relationships related to the polarization-multiplexed signal may include a Kramers-Kronig relationship related to the first polarization component and a Kramers-Kronig relationship related to the second polarization component.

The polarization demultiplexing circuit may include (a) a first combiner for generating the first intermediate signal by combining the first continuous wave signal and the first polarization component, and (b) a second combiner for generating the second intermediate signal by combining the second continuous wave signal and the second polarization component.

There may be provided a Kramers-Kronig receiver that may include a reception path; wherein the reception path may include (i) a Stokes receiver that may be configured to receive a polarization-multiplexed signal and to output a Stokes vector; wherein the polarization-multiplexed signal may include a first modulated signal, a second modulated signal and a continuous wave signal; wherein the first modulated signal may be of a first polarization; wherein the second modulated signal may be of a second polarization; wherein the continuous wave signal may be of the first modulation or of the second modulation; (ii) a set of analog to digital converters that may be configured to generate a digital representation of the Stokes vector; and (iii) a digital processor that may be configured to process the digital representation of the Stokes vector to provide a reconstructed polarization-multiplexed signal, wherein the processing may be based on a Kramers-Kronig relationship related to the polarization-multiplexed signal.

The polarization-multiplexed signal has a first polarization field and a second polarization field; wherein the Stokes vector may include a first Stokes receiver output signal that may be indicative of (a) a square of an absolute value of the first polarization field minus (b) a square of an absolute value of the second polarization field.

The Stokes vector may include a second Stokes receiver output signal that may be indicative of a real part of a given product of a multiplication of the first polarization field by the second polarization field, and a third Stokes receiver output signal that may be indicative of an imaginary part of the given product.

The digital processor may be configured to (i) calculate a rotation matrix that once applied to a time averaged Stokes vector provides a rotated vector that has a first non-zero element, a zero valued second element and a zero valued third element; (ii) apply the rotation matrix on the Stokes vector to provide a rotated Stokes vector; and (iii) calculate the reconstructed polarization-multiplexed signal based on the rotated Stokes vector.

There may be provided a Kramers-Kronig receiver that may include a reception path, a transmission path and a local oscillator. The local oscillator may be configured to generate a continuous wave (CW) signal. The transmission path may include a complex modulator that may be configured to receive the CW signal and may be configured to modulate the CW signal to generate a transmitted signal that may be transmitted to a communication link. The reception path may include (i) a combiner that may be configured to add the CW signal with a received signal from the communication link to provide a combined signal; wherein the received signal may include a first sideband and a second sideband that may be spaced apart from each other by a guard band; wherein the CW signal has a frequency that may be included in the guard band; (ii) a first optical filter that may be configured to filter the combined signal and output a first intermediate signal that may include the CW signal and the first sideband; (iii) a second optical filter that may be configured to filter the combined signal and output a second intermediate signal that may include the CW signal and the second sideband; (iv) a first photodiode that may be configured to receive the first intermediate signal and output a first photocurrent that represents the first intermediate signal; (v) a second photodiode that may be configured to receive the second intermediate signal and output a second photocurrent that represents the second intermediate signal; (vi) a first analog to digital converter that may be configured to generate a digital representation of the first photocurrent; (vii) a second analog to digital converter that may be configured to generate a digital representation of the second photocurrent; and (viii) a digital processor that may be configured to process the digital representation of the first photocurrent and the digital representation of the second photocurrent to provide a reconstructed received signal, wherein the processing may be based on a Kramers-Kronig relationship related to the received signal.

The guard band may or may not exceed a portion of a bandwidth of the first sideband.

There may be provided a Kramers-Kronig receiver that may include a reception path and a transmission path and a local oscillator that may be configured to generate a continuous wave (CW) signal. The transmission path may include a complex modulator that may be configured to receive the CW signal and may be configured to modulate the CW signal to generate a transmitted signal that may be transmitted to a communication link. The reception path may include (i) a polarization demultiplexing circuit that may be configured to receive a polarization-multiplexed signal and to output a first polarization component of the polarization-multiplexed signal and a second polarization component of the polarization-multiplexed signal; (ii) a first optical filter that may be configured to filter the first polarization component and output a first sideband of the first polarization component; (iii) a second optical filter that may be configured to filter the first polarization component and output a second sideband of the first polarization component; wherein the first and second sidebands of the first polarization component may be spaced apart from each other by a guard band; (iv) a first combiner that may be configured to add the CW signal with the first sideband of the first polarization component to provide a first combined signal; (v) a second combiner that may be configured to add the CW signal with the second sideband of the first polarization component to provide a second combined signal; (vi) a first photodiode that may be configured to receive the first combined signal and output a first photocurrent that represents the first combined signal; (vii) a second photodiode that may be configured to receive the second combined signal and output a second photocurrent that represents the second combined signal; (viii) a first analog to digital converter that may be configured to generate a digital representation of the first photocurrent; (ix) a second analog to digital converter that may be configured to generate a digital representation of the second photocurrent; (x) a third optical filter that may be configured to filter the second polarization component and output a first sideband of the second polarization component; (xi) a fourth optical filter that may be configured to filter the second polarization component and output a second sideband of the second polarization component; wherein the first and second sidebands of the second polarization component may be spaced apart from each other by the guard band; (xii) a third combiner that may be configured to add the CW signal with the first sideband of the second polarization component to provide a third combined signal; (xiii) a fourth combiner that may be configured to add the CW signal with the second sideband of the second polarization component to provide a fourth combined signal; (xiv) a third photodiode that may be configured to receive the third combined signal and output a third photocurrent that represents the third combined signal; (xv) a fourth photodiode that may be configured to receive the fourth combined signal and output a fourth photocurrent that represents the fourth combined signal; (xvi) a third analog to digital converter that may be configured to generate a digital representation of the third photocurrent; (xvii) a fourth analog to digital converter that may be configured to generate a digital representation of the fourth photocurrent; and (xviii) a digital processor that may be configured to process the digital representation of the first photocurrent, the second photocurrent, the third photocurrent and the fourth photocurrent to provide a reconstructed polarization-multiplexed signal, wherein the processing may be based on a Kramers-Kronig relationship related to the polarization-multiplexed signal.

There may be provided a method for receiving and processing signals using any of the Kramers-Kronig receivers illustrated above.

The method may include receiving a signal and reconstructing the signal based on at least one Kramers-Kronig relationship related to the signal.

There may be provided a method for receiving and reconstructing a received signal. The method may include (i) receiving, by a photodiode of a reception path of Kramers-Kronig receiver, a received signal; (ii) outputting by the photodiode a photocurrent that represents the received signal; wherein the received signal may include a continuous wave (CW) signal and a modulated signal; wherein a frequency gap between the CW signal and the modulated signal may be smaller than a bandwidth of the modulated signal; (iii) performing an analog to digital conversion of the photocurrent, by an analog to digital converter of the reception path, to generate a digital representation of the photocurrent; and (iii) processing, by a digital processor of the reception path, the digital representation of the photocurrent to provide a reconstructed modulated signal, wherein the processing may be based on a Kramers-Kronig relationship related to the received signal.

The Kramers-Kronig relationship related to the received signal may be a relationship between a phase and an amplitude of the field of the received signal.

The processing may include up-sampling the digital representation of the photocurrent to provide an up-sampled digital signal.

The processing may include calculating a logarithm of the up-sampled digital signal.

The processing may include applying a Hilbert transform on the logarithm of the up-sampled digital signal to provide a Hilbert transformed signal.

The processing may include calculating a reconstructed phase of the received signal based on the Hilbert transformed signal.

The processing may include calculating the reconstructed modulated signal based on the reconstructed phase of the received signal.

The reception path may consist essentially of the photodiode, the analog to digital converter and the digital processor.

The reception path may consist of the photodiode, the analog to digital converter and the digital processor.

The bandwidth of the analog to digital converter may be not smaller than a bandwidth of the received signal and may be smaller than twice the bandwidth of the received signal.

The bandwidth of the analog to digital converter may be not smaller than twice a bandwidth of the received signal.

The processing may exclude performing a logarithm operation.

The Kramers-Kronig relationship related to the received signal may be a relationship between a real part and an imaginary part of a frequency shifted version of the field of the received signal.

The processing may include calculating in an iterative manner the real part and the imaginary part of the frequency shifted version of the field of the received signal.

The processing may exclude up-sampling.

The reception path may or may not include a local oscillator.

The method may include outputting by a local oscillator of the Kramers-Kronig receiver the continuous wave signal; and adding the continuous wave signal to the modulated signal to provide the received signal.

There may be provided a method for receiving and reconstructing a polarization-multiplexed signal. The method may include (i) receiving by the polarization demultiplexing circuit of a reception path of Kramers-Kronig receiver, a polarization-multiplexed signal; (ii) outputting by the polarization demultiplexing circuit a first polarization component of the polarization-multiplexed signal and a second polarization component of the polarization-multiplexed signal; (iii) receiving by a first photodiode of the reception path of Kramers-Kronig receiver, a first intermediate signal that may include a first continuous wave signal and the first polarization component, (iv) outputting by the first photodiode a first photocurrent that represents the first intermediate signal; wherein a first frequency gap between the first continuous wave and the first intermediate signal does not exceed a bandwidth of the first intermediate signal; (v) receiving by a second photodiode of the reception path of Kramers-Kronig receiver a second intermediate signal that may include a second continuous wave signal and the second polarization component, (vi) outputting by the second photodiode a second photocurrent that represents the second intermediate signal; wherein a second frequency gap between the second continuous wave and the second intermediate signal does not exceed a bandwidth of the second intermediate signal; (vii) performing an analog to digital conversion of the first photocurrent, by a first analog to digital converter of the reception path, to generate a digital representation of the first photocurrent; (viii) performing an analog to digital conversion of the second photocurrent, by a second analog to digital converter of the reception path, to generate a digital representation of the second photocurrent; (ix) processing, by a digital processor of the reception path the digital representation of the first photocurrent and the digital representation of the second photocurrent to provide a reconstructed polarization-multiplexed signal, wherein the processing may be based on one or more Kramers-Kronig relationships related to the polarization-multiplexed signal.

The one or more Kramers-Kronig relationships related to the polarization-multiplexed signal may include a Kramers-Kronig relationship related to the first polarization component and a Kramers-Kronig relationship related to the second polarization component.

The method may include generating, by a first combiner the first intermediate signal by combining the first continuous wave signal and the first polarization component, and (b) a second combiner for generating the second intermediate signal by combining the second continuous wave signal and the second polarization component.

There may be provided a method for receiving and reconstructing a polarization-multiplexed signal, the method may include (i) receiving, by a Stokes receiver of a reception path of Kramers-Kronig receiver, the polarization-multiplexed signal; (ii) outputting by the Stokes receiver, a Stokes vector; wherein the polarization-multiplexed signal may include a first modulated signal, a second modulated signal and a continuous wave signal; wherein the first modulated signal may be of a first polarization; wherein the second modulated signal may be of a second polarization; wherein the continuous wave signal may be of the first modulation or of the second modulation; (iii) performing an analog to digital conversion, by a set of analog to digital converters, of the Stokes vector to provide a digital representation of the Stokes vector; and (iv) processing, by a digital processor of the reception path of Kramers-Kronig receiver, the digital representation of the Stokes vector to provide a reconstructed polarization-multiplexed signal, wherein the processing may be based on a Kramers-Kronig relationship related to the polarization-multiplexed signal.

The polarization-multiplexed signal has a first polarization field and a second polarization field; wherein the Stokes vector may include a first Stokes receiver output signal that may be indicative of (a) a square of an absolute value of the first polarization field minus (b) a square of an absolute value of the second polarization field.

The Stokes vector may include a second Stokes receiver output signal that may be indicative of a real part of a given product of a multiplication of the first polarization field by the second polarization field, and a third Stokes receiver output signal that may be indicative of an imaginary part of the given product.

The processing may include (i) calculating a rotation matrix that once applied to a time averaged Stokes vector provides a rotated vector that has a first non-zero element, a zero valued second element and a zero valued third element; (ii) applying the rotation matrix on the Stokes vector to provide a rotated Stokes vector; and (iii) calculating the reconstructed polarization-multiplexed signal based on the rotated Stokes vector.

There may be provided a method. The method may include (i) generating by a local oscillator a continuous wave (CW) signal; (ii) modulating, by a complex modulator, the CW signal to generate a transmitted signal that may be transmitted to a communication link, (iii) adding, by a combiner of a reception path of Kramers-Kronig receiver, the CW signal with a received signal from the communication link to provide a combined signal; wherein the received signal may include a first sideband and a second sideband that may be spaced apart from each other by a guard band; wherein the CW signal has a frequency that may be included in the guard band; (iv) filtering, by a first optical filter of the reception path of Kramers-Kronig receiver, the combined signal and output a first intermediate signal that may include the CW signal and the first sideband; (v) filtering, by a second optical filter of the reception path of Kramers-Kronig receiver, the combined signal and output a second intermediate signal that may include the CW signal and the second sideband; (vi) receiving by a first photodiode of the reception path of Kramers-Kronig receiver the first intermediate signal and outputting a first photocurrent that represents the first intermediate signal; (vii) receiving, by a second photodiode of the reception path of Kramers-Kronig receiver, the second intermediate signal and outputting a second photocurrent that represents the second intermediate signal; (viii) performing an analog to digital conversion of the first photocurrent, by a first analog to digital converter of the reception path, to generate a digital representation of the first photocurrent; (ix) performing an analog to digital conversion of the second photocurrent, by a second analog to digital converter of the reception path, to generate a digital representation of the second photocurrent; and (x) processing, by a digital processor of the reception path of Kramers-Kronig receiver, the digital representation of the first photocurrent and the digital representation of the second photocurrent to provide a reconstructed received signal, wherein the processing may be based on a Kramers-Kronig relationship related to the received signal.

The guard band may or may not exceed a portion of a bandwidth of the first sideband.

There may be provided a method. The method may include (i) generating by a local oscillator a continuous wave (CW) signal; (ii) modulating, by a complex modulator, the CW signal to generate a transmitted signal that may be transmitted to a communication link, (iii) receiving a polarization-multiplexed signal by a polarization demultiplexing circuit of the reception path of Kramers-Kronig receiver and outputting a first polarization component of the polarization-multiplexed signal and a second polarization component of the polarization-multiplexed signal; (iv) filtering, by a first optical filter of the reception path of Kramers-Kronig receiver, the first polarization component and outputting a first sideband of the first polarization component; (v) filtering, by a second optical filter of the reception path of Kramers-Kronig receiver, the first polarization component and outputting a second sideband of the first polarization component; wherein the first and second sidebands of the first polarization component may be spaced apart from each other by a guard band; (vi) combining, by a first combiner of the reception path of Kramers-Kronig receiver, the CW signal with the first sideband of the first polarization component to provide a first combined signal; (vii) combining, by a second combiner of the reception path of Kramers-Kronig receiver the CW signal with the second sideband of the first polarization component to provide a second combined signal; (vii) receiving, by a first photodiode of the reception path of Kramers-Kronig receiver, the first combined signal and outputting a first photocurrent that represents the first combined signal; (viii) receiving, by a second photodiode of the reception path of Kramers-Kronig receiver, the second combined signal and outputting a second photocurrent that represents the second combined signal; (ix) converting, by a first analog to digital converter of the reception path of Kramers-Kronig receiver, the first photocurrent to provide a digital representation of the first photocurrent; (x) converting, by a second analog to digital converter of the reception path of Kramers-Kronig receiver, the second photocurrent to provide a digital representation of the second photocurrent; (xi) filtering, by a third optical filter of the reception path of Kramers-Kronig receiver, the second polarization component and outputting a first sideband of the second polarization component; (xii) filtering, by a fourth optical filter of the reception path of Kramers-Kronig receiver, the second polarization component and outputting a second sideband of the second polarization component; wherein the first and second sidebands of the second polarization component may be spaced apart from each other by a guard band; (xiii) combining, by a third combiner of the reception path of Kramers-Kronig receiver, the CW signal with the first sideband of the second polarization component to provide a third combined signal; (xiv) combining, by a fourth combiner of the reception path of Kramers-Kronig receiver the CW signal with the second sideband of the second polarization component to provide a fourth combined signal; (xv) receiving, by a third photodiode of the reception path of Kramers-Kronig receiver, the third combined signal and outputting a third photocurrent that represents the third combined signal; (xvi) receiving, by a fourth photodiode of the reception path of Kramers-Kronig receiver, the fourth combined signal and outputting a fourth photocurrent that represents the fourth combined signal; (xvii) converting, by a third analog to digital converter of the reception path of Kramers-Kronig receiver, the third photocurrent to provide a digital representation of the third photocurrent; (xviii) converting, by a fourth analog to digital converter of the reception path of Kramers-Kronig receiver, the fourth photocurrent to provide a digital representation of the fourth photocurrent; (xix) processing, by a digital processor of the reception path the digital representation of the first photocurrent, the second photocurrent, the third photocurrent and the fourth photocurrent to provide a reconstructed polarization-multiplexed signal, wherein the processing may be based on a Kramers-Kronig relationship related to the polarization-multiplexed signal.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 9A illustrates a BER versus OSNR according to at least one embodiment of the invention;

FIG. 9B illustrates a BER versus transmitted power according to at least one embodiment of the invention;

DETAILED DESCRIPTION OF THE DRAWINGS

Figure 1A:
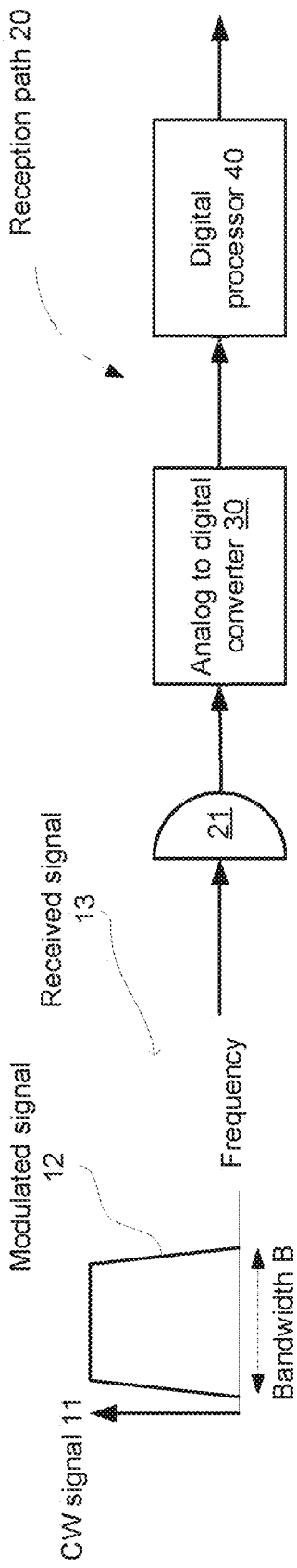
FIG. 1A illustrates a Kramers-Kronig receiver according to at least one embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The term "field" refers to an electric field.

There is provided a direct-detection coherent receiver which combines the advantages of coherent transmission and the cost-effectiveness of direct detection. The working principle of the proposed receiver is based on the Kramers-Kronig relations, and its implementation requires having a continuous-wave signal at one edge of the information-carrying signal spectrum.

The Kramers-Kronig receiver scheme allows digital post-compensation of linear propagation impairments and, as compared to other existing solutions, is more efficient in terms of spectral occupancy and energy consumption.

The Kramers-Kronig receiver may include hardware components such as a radio frequency (RF) front end or interface, one or more antennas, frequency downconverters, adders, digital and/or analog filters, memory, and a hardware processor. The hardware processor may execute instructions for digital processing.

The suggested scheme eliminates the need for a frequency gap between the local oscillator (continuous wave signal) and the modulated signal (also referred to as information carrying signal) and hence increases the spectral efficiency by a factor of two in comparison with the self-heterodyne scheme illustrated in reference [1]—B. J. C. Schmidt, A. J. Lowery, and J. Armstrong, "Experimental Demonstrations of Electronic Dispersion Compensation for Long-Haul Transmission Using Direct-Detection Optical OFDM," J. Lightwave Technol. 26, 196-203 (2008). The self-heterodyne scheme requires a gap of a magnitude of the bandwidth of the modulated signal.

The continuous wave signal may be provided by the transmitter (included in a received signal) or may be added by a local oscillator of the receiver.

The extraction of the received field from the photocurrent is performed digitally while taking advantage of the Kramers-Kronig relationship—such as the Kramers-Kronig relationship between the phase and amplitude of the field of the received signal—the field that impinges upon the photodiode. Yet another Kramers-Kronig relationship is the relationship between the real and imaginary parts of the received signal.

The Kramers-Kronig relations are somewhat ubiquitous, as they emerge in various areas of physics and engineering. Their applicability in the context of direct-detection coherent receivers follows from a simple property of minimum phase signals.

The proposed scheme allows the full reconstruction of the complex envelope of the filed impinging upon the photodiode, and hence it is compatible with DSP-based digital compensation of propagation-induced linear impairments.

The gain in spectral efficiency may come at the expense of a somewhat more stringent requirement on the power of the CW signal in comparison with the self-heterodyne scheme. Nonetheless, it is shown in what follows, in practical scenarios this power requirement can be considerably relaxed.

The field reconstruction procedure performed by the Kramers-Kronig receiver is illustrated below.

A sufficient condition for distortion-free operation of the Kramers-Kronig receiver implies that if s(t) is a complex signal whose spectrum is contained between $-B/2$ and $B/2$, then $h(t)=A+s(t)\exp^{(-i\pi Bt)}$ is a minimum phase signal, provided that $|s(t)|<A$, for all t. In this case, denoting $h(t)=|h(t)|\exp[i\varphi(t)]$, the absolute value $|h(t)|$ and the argument $\varphi(t)$ are uniquely related to each other via the Hilbert transform:

$$\phi(t) = \frac{1}{\pi} p.v. \int_{-\infty}^{\infty} dt' \frac{\log[|h(t')|]}{t-t'}, \quad (1)$$

Where p.v. stands for principal value. Equation (1) is a Kramers-Kronig relation existing between $\varphi$ and $\log[|h|]$, and is most conveniently implemented in the frequency domain where it assumes the form $$\tilde{\phi}(\omega) = i\,\mathrm{sign}(\omega)\,\mathcal{F}\{\log[|h(t)|]\}, \quad (2)$$

Where $\mathrm{sign}(\omega)$ is the sign function, which is equal to 1 for $\omega>0$, to 0 for $\omega=0$, and to $-1$ for $\omega<0$, and where F denotes a Fourier transform. It should be noted that the phase reconstruction is exact up to a constant phase offset. This can be seen most easily from Equation (2), where the zero-frequency component of $\tilde{\phi}(\omega)$ is set to zero by the sign function.

We now proceed to describing the field reconstruction procedure performed by the Kramers-Kronig receiver, where we assume for simplicity a scalar description of the field that adequately represents the case in which no polarization multiplexing is done.

Schemes that accommodate polarization multiplexing will be introduced subsequently We denote the complex envelope of the field (of the received signal) by $E_s(t)$ which is assumed to be contained within a finite optical bandwidth denoted by B. The local oscillator is assumed to output a continuous wave (CW) signal whose amplitude is $E_0$ and whose frequency may coincide with the left edge (or the right edge) of the information-carrying signal spectrum.

Some of the following formulas refer to a case where the CW signal is located to the left (lower frequency) of the modulated signal. These equations are applicable mutatis mutandis to a case where the CW signal is located to the right (higher frequency) of the modulated signal.

We assume that $E_0$ is real-valued and positive, which is equivalent to referring all phase values to that of the local oscillator. The complex envelope of the field impinging upon the photodiode is thus $E(t)=E_s(t)+E_0\exp(i\pi Bt)$.

Provided that the local oscillator amplitude is chosen such that $E_0>|E_s(t)|$ for all t, the signal $E(t)e^{-i\pi Bt}=E_0+E_s(t)e^{-i\pi Bt}$ is guaranteed to be minimum phase. In practice, E(t) can be minimum phase even if the condition $E_0>|E_s(t)|$ is not satisfied for all values of t. A less restrictive condition is that the trajectories of E(t) in the complex plane do not encircle the origin.

Thus, the signal E(t) can be appropriate for our form of communications even when the condition $E_0>|E_s(t)|$ is not explicitly satisfied. Hence, the determination of the appropriate minimum value of $E_0$ can be done on the basis of the less restrictive condition, or it can be performed by empirical optimization.

The photocurrent I produced by the photodiode is proportional to the field intensity $I=|E(t)|^2$, where we have set the proportionality coefficient to 1, for the sake of simplicity. Hence, using Equations (1) and (2), the signal $E_s(t)$ can be reconstructed as follows $$E_s(t) = \left\{\sqrt{I(t)}\exp[i\phi_E(t)] - E_0\right\}\exp(i\pi Bt), \quad (3)$$

$$\phi_E(t) = \frac{1}{2\pi} p.v. \int_{-\infty}^{\infty} dt' \frac{\log[I(t')]}{t-t'}. \quad (4)$$

A possible issue with the signal reconstruction described above is that the logarithm appearing in Equation (4) introduces spectral broadening which may necessitate digital up-sampling of the received photocurrent.

Another signal reconstruction approach that resolves this issue makes use of the fact that the frequency shifted signal $E'_s(t)=E_s(t)e^{-i\pi Bt}$ has real and imaginary parts $E'_{s,r}(t)$ and $E'_{s,i}(t)$ satisfying the Kramers-Kronig relations, $$E'_{s,i}(t) = \frac{1}{\pi} p.v. \int_{-\infty}^{\infty} dt' \frac{E'_{s,r}(t')}{t-t'}. \quad (5)$$

Using $I(t)=|E_0+E'_s(t)|$ (and referring to $E_0$ as real valued without loss of generality), one obtains the equality $$I(t)=E_0^2+{E'_{s,r}}^2(t)+{E'_{s,i}}^2(t)+2E_0 E'_{s,r}(t) \quad (6)$$

Once $E'_s(t)$ is replaced by its expression given by Equation (5), Equation (6) becomes an integral equation that, being equivalent to Equations (3) and (4), has a unique solution if $E_0>|E_s(t)|$ for all t, which can be obtained by means of the iterative procedure described in what follows. Equation (6) can be formally solved for $E'_{s,r}(t)$ with the result $$E'_{s,r}(t)=\sqrt{I(t)-E'^{2}_{s,i}(t)}-E_0, \quad (7)$$

where we have taken the positive determination of the square root because it is the only one consistent with the Kramers-Kronig condition, $E_0>|E_S(t)|$. Equation (7) can be solved by iterations, where in the first step one solves for $E'_{s,r}(t)$ while setting $E'_{s,i}(t)=0$ on the right-hand side of (7). The resulting $E'_{s,r}(t)$ is then filtered using a square filter of bandwidth B, and used to extract the next iteration of $E'_{s,i}(t)$ through Equation. (5).

The procedure is then repeated until the values of $E'_{s,r}(t)$ and $E'_{s,i}(t)$ stabilize to a desired extent. For demonstrating the Kramers-Kronig scheme we assume that the oversampling of the photocurrent is not an issue and hence in what follows we apply the procedure represented in Equations (1)-(4).

The other signal reconstruction approach (part of the processing by the digital processor—may also referred to a Kramers-Kronig algorithm) may include:
  a. Setting $E_{s,i}=0$ and find $E_{s,r}$ from Equation (7).
  b. Inserting $E_{s,r}$ into Equation (5) find $E_{s,i}$.
  c. Filtering $E_{s,i}$ in a filter bandwidth of B (passband between 0 and B).
  d. Using $E_{s,i}$ to find $E_{s,r}$ from Equation (7).
  e. Filtering $E_{s,r}$ in a filter bandwidth of B (passband between 0 and B).
  f. Repeating steps b, c, d and e for a predefined number of times in order to obtain desired accuracy. Typically, three repetitions (iterations) are sufficiently accurate.

Figure 1B:
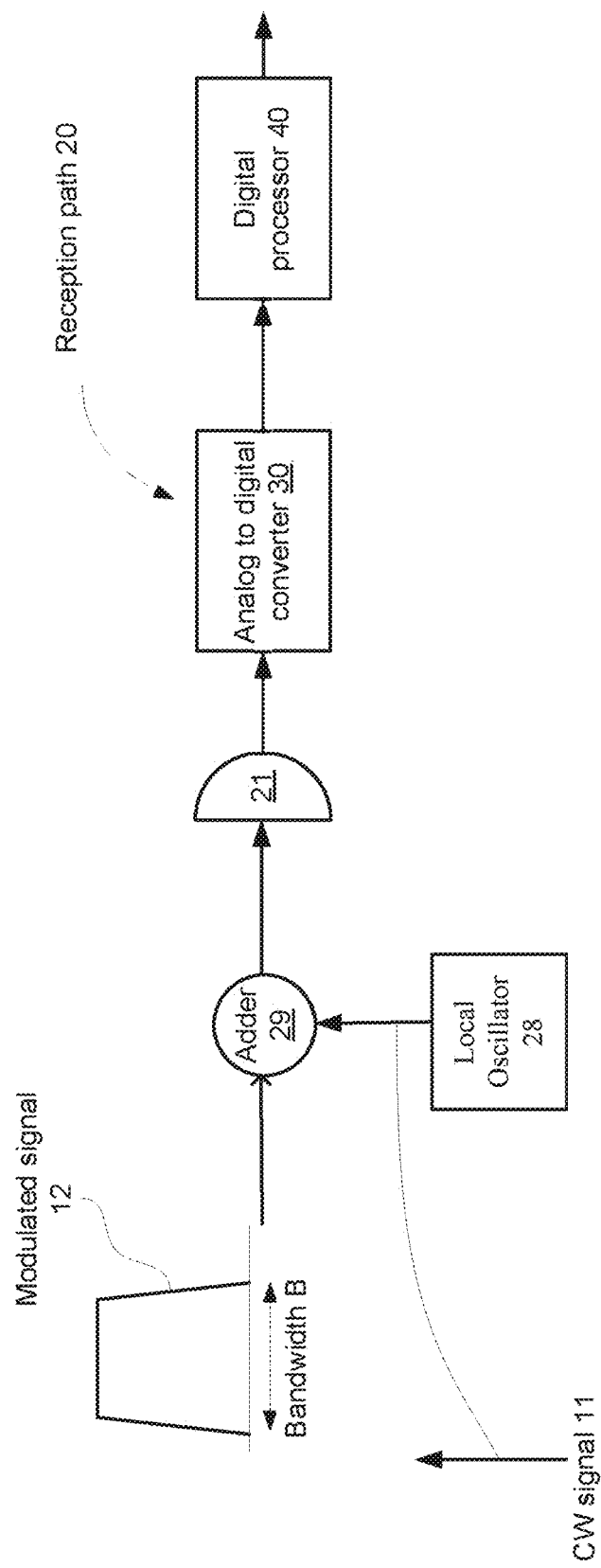
FIG. 1B illustrates a Kramers-Kronig receiver according to at least one embodiment of the invention.
Figure 6:
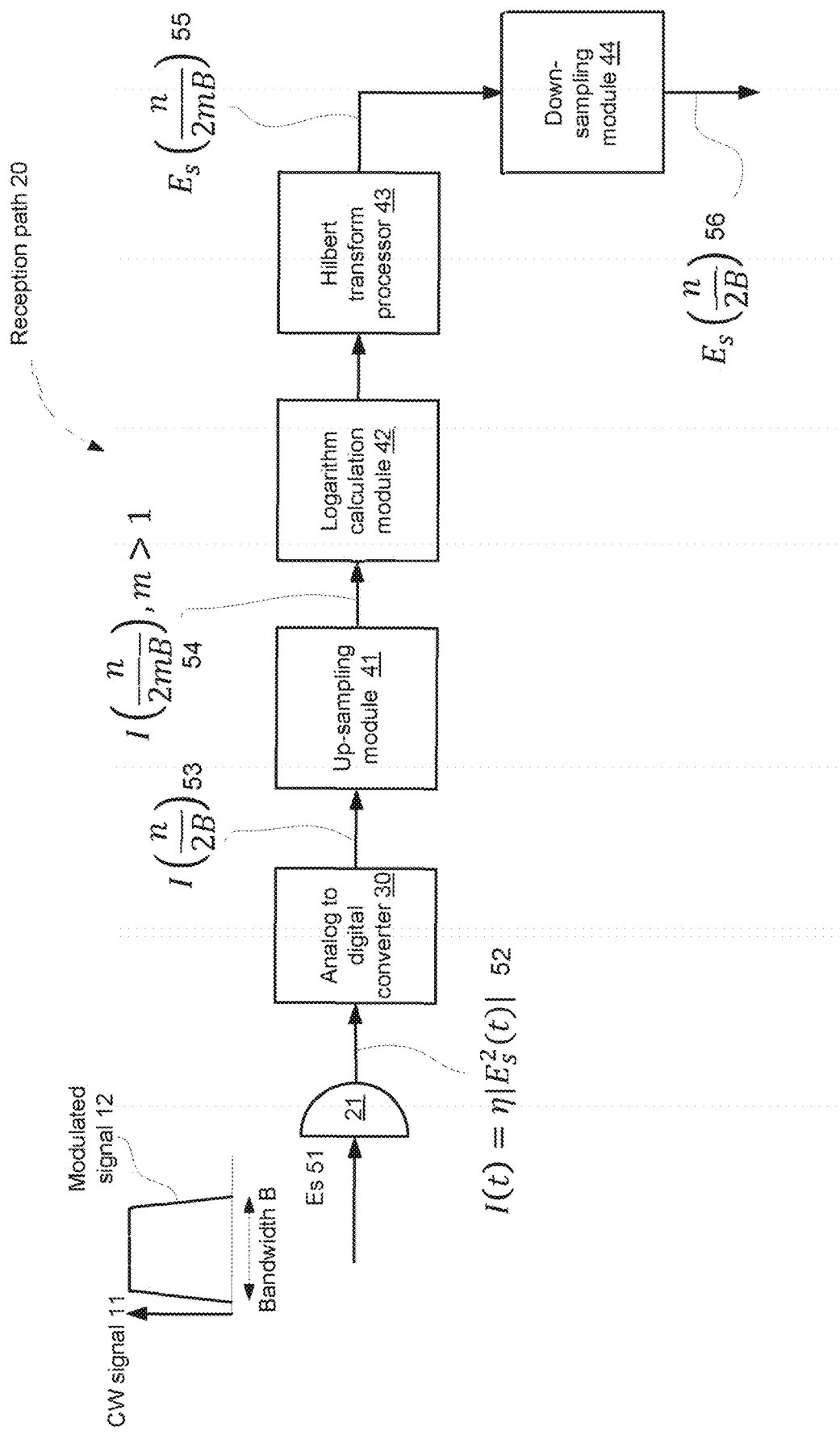
FIG. 6 illustrates a Kramers-Kronig receiver according to at least one embodiment of the invention.

Various implementations of the Kramers-Kronig receiver are plotted in FIGS. 1A, 1B and 6.

Referring to FIG. 1A—a received signal that includes a continuous wave signal (CW signal at a left edge of the modulated signal) and a modulated signal 12 (of bandwidth B) is received by a reception path 20 of the Kramers-Kronig receiver.

The received signal, is directly detected by photodiode 21, then sampled at the sampling rate of 2B (by analog to digital converter 30 that has a bandwidth of at least 2B). The digital samples are finally processed (by digital processor 40) for chromatic dispersion compensation and extraction of the transmitted symbols. The processing may include removing the CW signal, or removing an estimated CW signal, removing an average value (DC) of the received signal. The digital processor may perform, for example phase recovery, chromatic dispersion compensation, and possibly nonlinear distortion compensation.

The digital processor 40 may performs a Kramers-Kronig algorithm by executing the steps of:
  i. Up-sample the digital representation of the photocurrent I(t)
  ii. Calculate a reconstructed phase $\varphi_E(t)=0.5*\text{Hilbert}\{\log (I(t))\}$.
  iii. Calculate a reconstructed modulated signal $E_s(t)=\sqrt{I(t)}e^{i\Phi_E(t)}-E_0$, where $E_0$ is the complex envelope of the CW signal, which may be evaluated as the time average of $\sqrt{I(t)}e^{i\Phi_E(t)}$
  iv. Perform coherent processing steps.

FIG. 1B shows an alternative implementation, where the local oscillator 28 is added (by adder 29) to the modulated signal at the receiver using a frequency-selective coupler to avoid signal and local oscillator loss. In this case the transmitter does not transmit the CW signal.

Figure 7A:
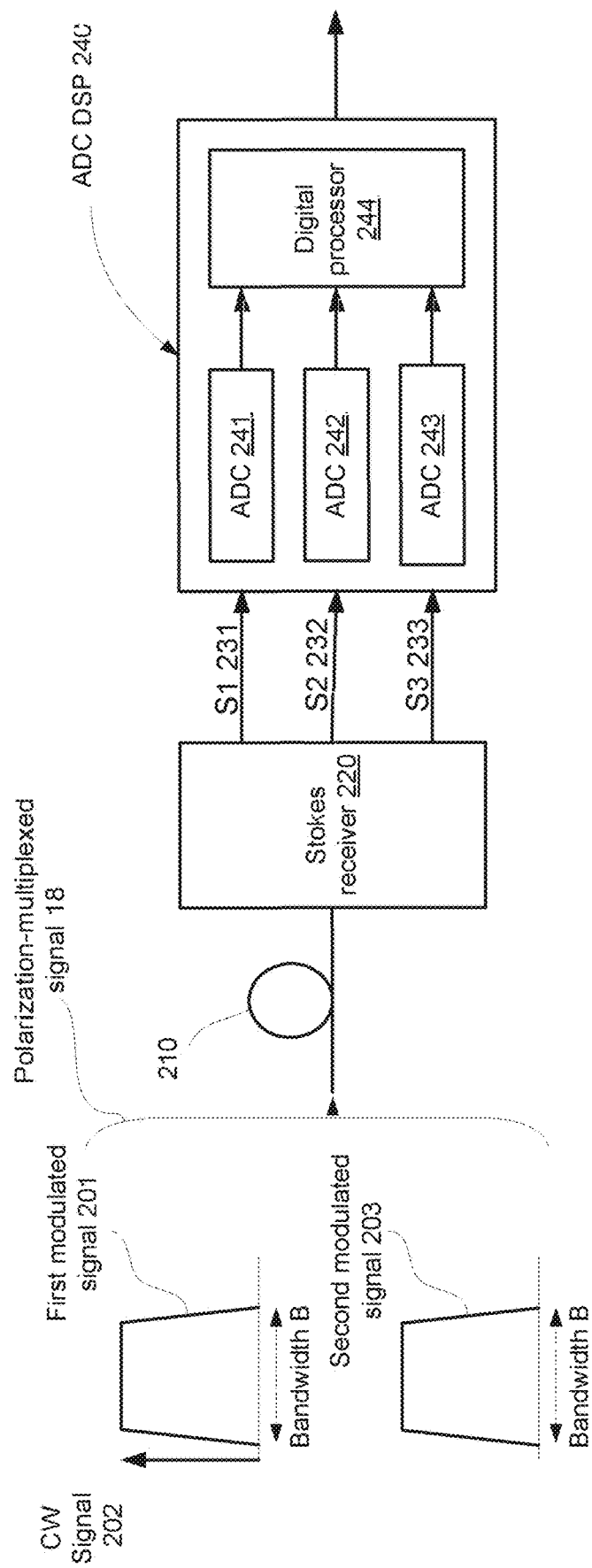
FIG. 7A illustrates a Stokes Kramers-Kronig receiver according to at least one embodiment of the invention.
Figure 7B:
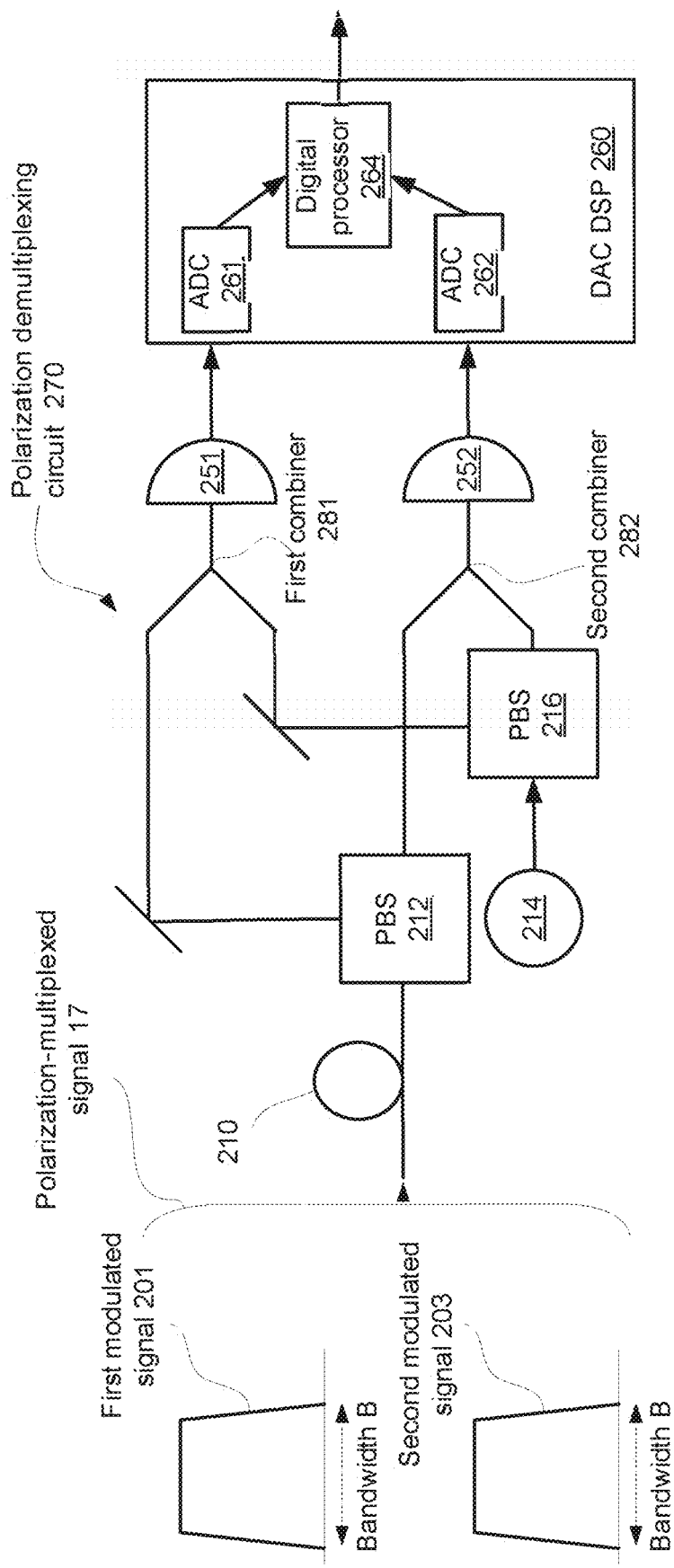
FIG. 7B illustrates a Kramers-Kronig receiver according to at least one embodiment of the invention.

This implementation accommodates polarization multiplexing (as illustrated in FIG. 7B), eliminates the need for an optical hybrid at the receiver, and requires the use of a single photodiode. However, it may require a local oscillator laser.

Alternatively—the CW signal can be extracted from the received signal—in case were the transmitter also transmits a CW signal in addition to the information-carrying signal.

An alternative method for extracting the signal without performing the log operation and hence avoiding the need for up-sampling was discussed in the previous section.

Numerical Validation of the Kramers-Kronig Receiver

We start by providing a numerical proof-of-concept of the Kramers-Kronig receiver scheme. To that end we consider the case in which the signal impinging upon the receiver is produced by filtering white Gaussian noise with a square optical filter of bandwidth B. Since Gaussian noise is characterized by the largest entropy that can be carried by signals of the same bandwidth, it seems natural to use it for validating the Kramers-Kronig receiver concept.

Figure 2:
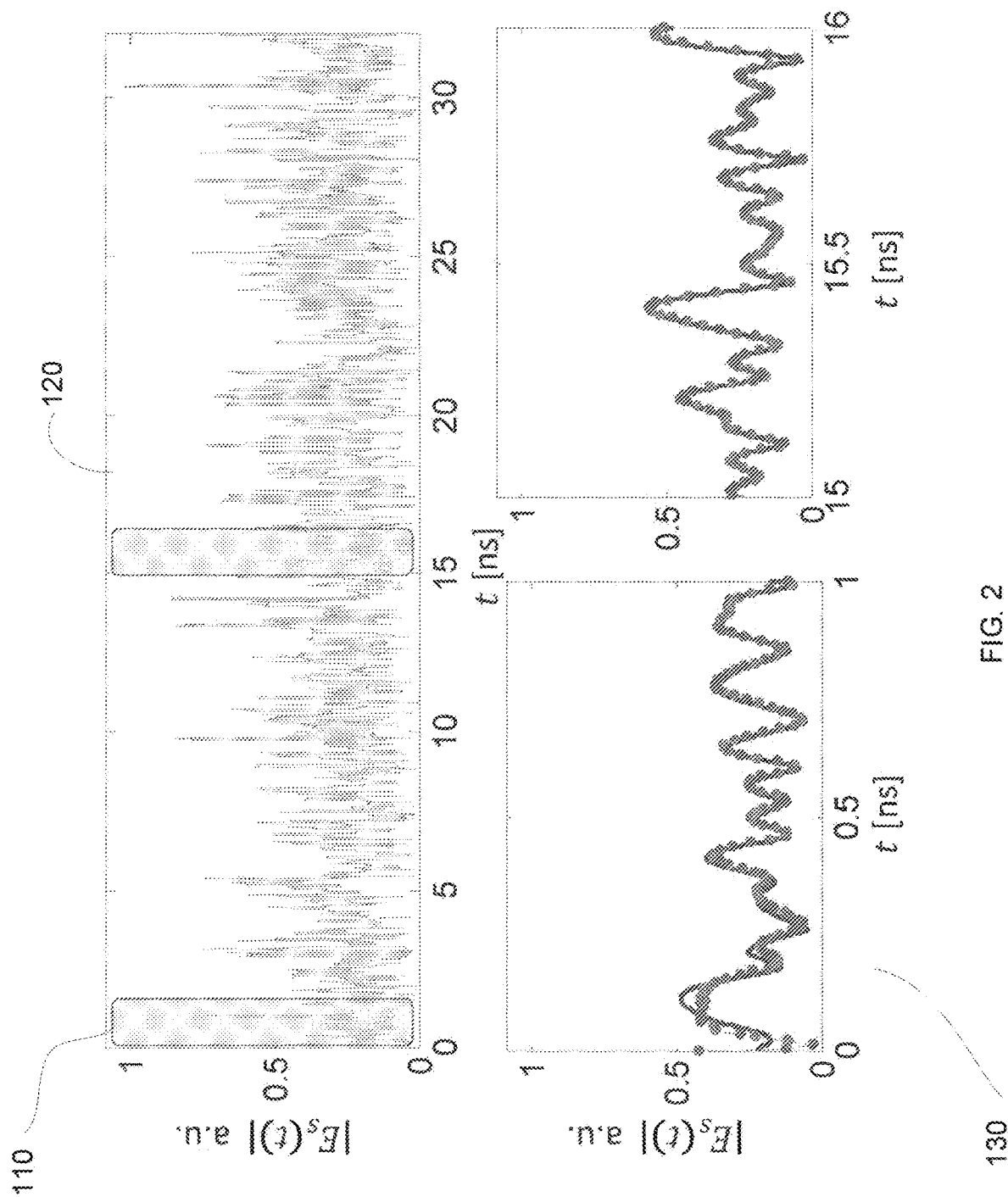
FIG. 2 illustrates absolute values of an original waveform and a reconstructed waveform according to at least one embodiment of the invention.

FIG. 2 shows the absolute values of the original and the reconstructed waveforms by solid and dot-dashed lines, respectively (a similar picture corresponds to the real or imaginary parts). The computation was performed with B=32 GHz, using a time window T=1024/B. The signal samples used to perform the Hilbert transform were taken at a rate of 2 B.

The signal used in the simulation was generated as a complex-valued circular Gaussian waveform with a flat-top spectrum of width B=32 GHz, which was normalized such that its largest absolute value within the simulated time window was $0.99E_0$. The top panel shows the signal intensity within the entire simulated time window, whereas the bottom panels zoom into the waveform in two distinct intervals. In the left panel, we show the beginning of the frame, where the edge effect of the Hilbert transform is visible. The waveform reconstruction error is large initially, but then it reduces as the distance from the beginning of the frame increases. The waveform in the right panel is taken from the middle of the frame, where the edge effect is absent, and the quality of the reconstruction is excellent. As can be seen in the figure, the duration of the edge effect is of the order of 0.5 ns, which is equivalent to ~16/B. The edges in the beginning and in the end of the processed frame will have to be discarded in a practical implementation of the Kramers-Kronig receiver. As is discussed in what follows, a similar situation, where the edges of the processed frame need to be discarded, characterizes the digital compensation of chromatic dispersion.

Again—referring to FIG. 2—panel 110 shows the absolute values of the original waveform (continuous) and reconstructed (dashed) waveforms. Panels 120 and 130 zoom into the beginning and the center of the frame, respectively.

Linear Transmission Performance

Figure 3:
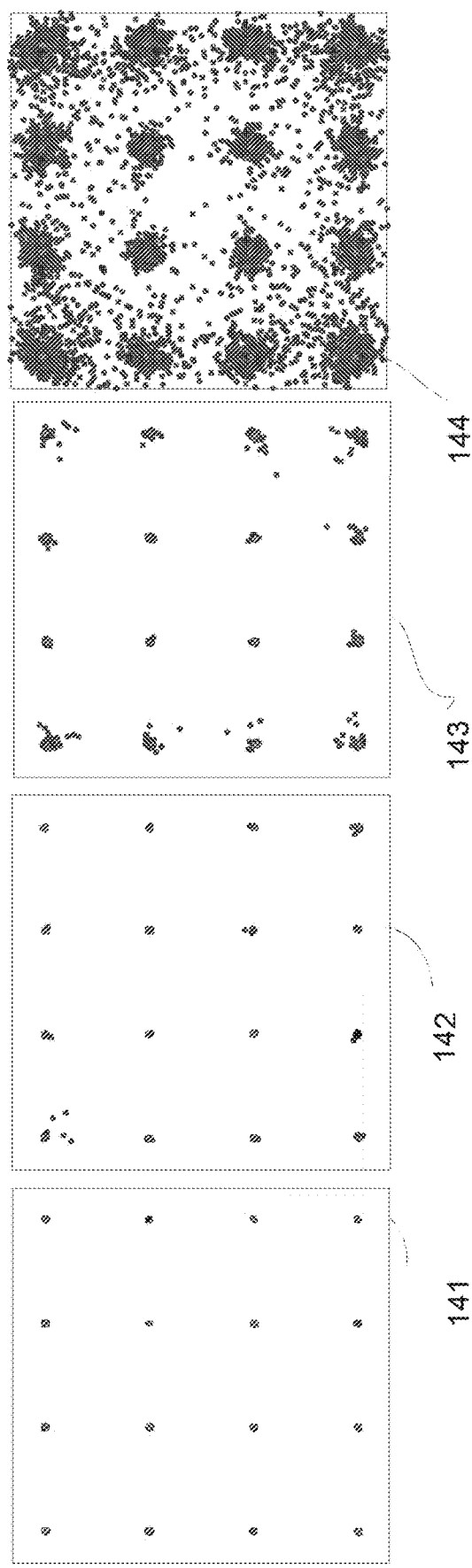
FIG. 3 illustrates received constellations according to at least one embodiment of the invention.

We now switch to demonstrating the implementation of the Kramers-Kronig transceiver in the context of a digital communication system transmitting QAM signals. We focus first on the linear regime of operation, where the effect of the fiber nonlinearity is negligible. FIG. 3 refers to the back-to-back configuration. Back to back configuration describes a scenario in which the transmitter and the receiver are connected directly with each other without an optical fiber of with an optical fiber of negligible length. or connected Panels 141, 142, 143 and 144 show the received constellations for single-channel 16-QAM signaling, where a raised cosine fundamental waveform with 0.05 roll-off factor was assumed. Since this figure was plotted in the regime of linear transmission, and in the absence of noise, the displayed results are not affected by the baudrate.

The various panels correspond to different settings of the local oscillator power $P_{LO}=E_0^2$. In the leftmost panel (141) the local oscillator power was set to 1.1 times the maximum value of the information carrying signal power, corresponding to about 11 dB above the average signal power, and the received constellation was indeed perfect (the edge-effect seen in FIG. 2 was taken care of by discarding the symbols at the edges of the simulation time window).

In the remaining three panels, the CW signal power level was reduced to 8 db (142), 6 db (143) and 3 dB (144) above the average channel power.

FIG. 3 shows that the received constellation quality deteriorates as the power of the CW signal is reduced. The scattering of the constellation points is caused by the fact that the instantaneous power of the information carrying signal occasionally exceeds the CW signal power, thus violating the minimum-phase condition for signal reconstruction underpinning the Kramers-Kronig receiver concept.

Practical considerations suggest that one should pick the lowest local oscillator power for which the reconstruction noise shown in FIG. 3 is sufficiently small to allow reliable detection. Indeed, large values of the local oscillator power would deteriorate the system's power efficiency and, as we show in what follows, reduce its tolerance to propagation-induced nonlinear distortions.

Figure 4:
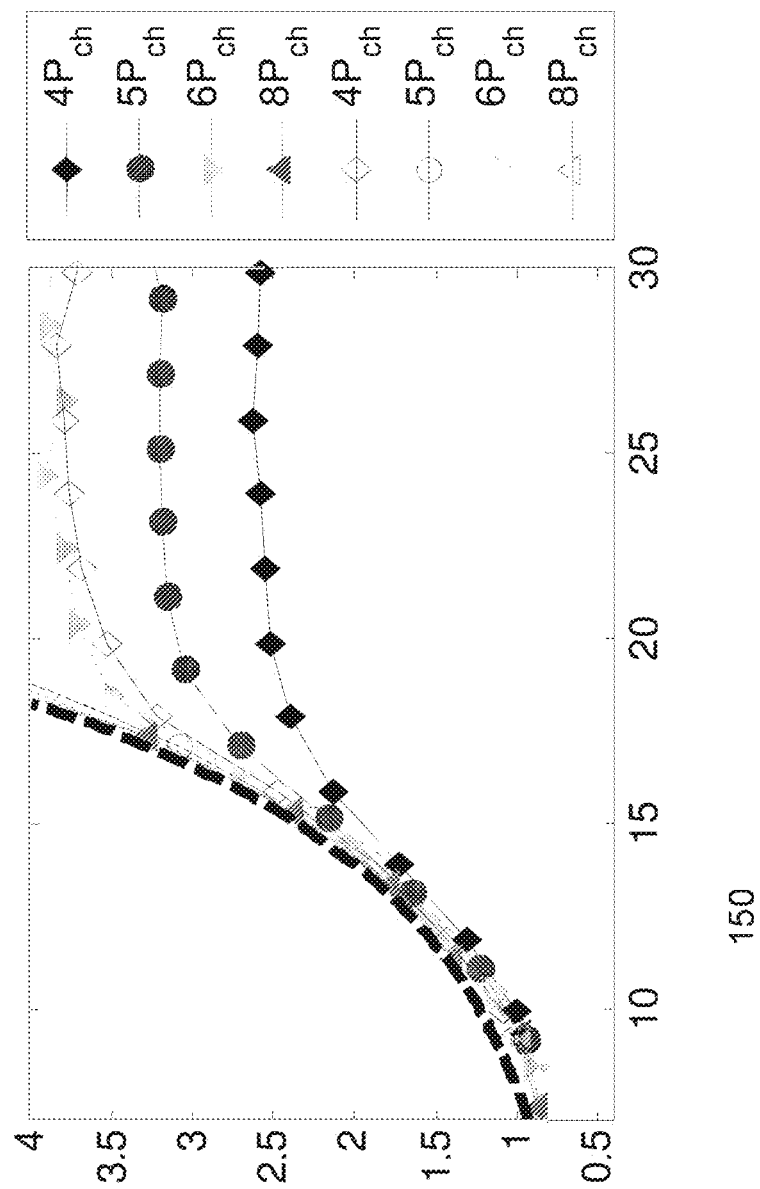
FIG. 4 illustrates a bit error rate (BER) versus optical signal to noise ratio (OSNR) for a 24 Gbaud 16 quadrature amplitude modulation (QAM) modulated signal according to at least one embodiment of the invention.

FIG. 4 includes panel 150 and illustrates the penalty introduced by a noncompliant CW signal power in the presence of amplification noise. Plotted in the figure is the BER as a function of OSNR for a 24 Gbaud 16 QAM modulated signal, for a range of LO powers. Empty markers show the results obtained in the back-to-back configuration, whereas filled markers refer to the case of linear transmission through a 100 km single-mode fiber link. In the latter case, chromatic dispersion was compensated electronically at the receiver, after signal reconstruction. In all simulations, the information-carrying signal consisted of a pseudo-random sequence of $2^{14}$ symbols. Prior to reception, amplification noise was added to the signal and then a 12th order super-Gaussian optical filter with a 3 dB bandwidth of 40 GHz was applied. The figure confirms the benefit of increasing the LO power: at low levels the BER saturates for increasing OSNR, owing to the errors caused by imperfect signal reconstruction. This saturation tends to disappear when the LO power is sufficiently large.

The difference between the back-to-back results and the results obtained with SMF transmission shows that electronic CD compensation implies an OSNR penalty, as well as an increase in the smallest achievable BER. The reason for this penalty is in the larger peak-to-average power ratio (PAPR) of the CD-impaired information carrying signal, as compared to the PAPR of the launched signal. The OSNR penalty could in principle be avoided either by pre-compensating the modulated signal, or by implementing optical CD compensation at the receiver, although this would imply an obvious complication of the transceiver structure.

FIG. 4 illustrates BER versus OSNR for a 24 Gbaud 16 QAM modulated signal. Each curve was obtained by setting the power of the local oscillator to the value shown in the legend. Empty markers refer to the back-to-back configuration, while filled markers were obtained for a 100 km single-span link, where CD was compensated electronically at the receiver after signal reconstruction.

The results of FIG. 4 indicate that for OSNR values higher than 20 dB, pre-FEC BERs lower than $10^{-2}$ can be achieved with a local oscillator power exceeding the average channel power by about 7 dB (implying that the total transmitted power increases by 7.8 dB relative to coherent transmission). This makes the Kramers-Kronig scheme considerably more power efficient than the scheme of reference [2]—S. Randel, D. Pilori, S. Chandrasekhar, G. Raybon, and P. J. Winzer "100-Gb/s Discrete-Multitone Transmission Over 80-km SSMF Using Single-Sideband Modulation with Novel Interference-Cancellation Scheme," Proc. of European Conference of Optical Communications 2015 (ECOC15), Valencia—Spain, Paper 0697 (2015).

On the other hand, it should be stressed that the Kramers-Kronig scheme is twice more spectrally efficient than IMDD—the lower spectral efficiency of IMDD follows from the fact that with intensity modulation no information is encoded into the optical phase. This makes IMDD inferior even to single-quadrature modulation, where positive and negative amplitude values can be used) and the self-heterodyne scheme.

A detailed comparison with other known direct-detection schemes in terms of spectral efficiency, power efficiency, and amenability to digital dispersion compensation, is shown in Table 1. To facilitate the comparison of spectral efficiencies, we express the optical bandwidth in terms of R, which is the lowest sampling rate that allows reconstruction of the detected photocurrent.

As can be seen from the table, the Kramers-Kronig scheme provides an attractive combination of properties.

Table 1 includes a comparison between various schemes in terms of optical bandwidth, suitability for digital compensation of linear impairments, and power efficiency. The symbol R represents the bandwidth of the detected photocurrent, which is also the lowest acceptable sampling rate.

The ratio $P_{LO}/P_S$ ranges from 10 to 20 in reference [3]—M. Schuster, S. Randel, C. A. Bunge, S. C. J. Lee, F. Breyer, B. Spinnler, and K. Petermann, "Spectrally Efficient Compatible Single-Sideband Modulation for OFDM Transmission With Direct Detection," IEEE Photon. Technol. Letters 20, 670-672 (2008).

The ratio $P_{LO}/P_S$ is of the order of 30 in reference [2].

This ratio reduces to values ranging from 4 to 8 in the case of the Kramers-Kronig scheme.

|  | Optical Bandwidth | Digital Compensation | $P_{LO}/P_s$ |
| --- | --- | --- | --- |
| IMDD | R | not possible | N/A |
| Schmidt-reference [1] | R | possible | ~1 |
| Schuster-reference [3] | R/2 | not possible | >>1 |
| Randel-reference [2] | R/2 | possible | >>1 |
| Kramers-Kronig (Current) | R/2 | possible | >1 |

Nonlinear Transmission Performance

In this section, we investigate the limitations imposed by the fiber nonlinearity to the implementation of the Kramers-Kronig transceiver in coherent transmission systems of the kind considered in the previous section. The main results of this investigation are presented in FIG. 5, which was obtained for a DWDM system with five 16 QAM channels at 24 Gbaud. The channel spacing was set to 40 GHz. The BER of the channel of interest is plotted in FIG. 5 as a function of the total transmit power, which is the sum of the channel power and the local oscillator power. The upper panel 151 and the lower panel 152 refer to a one-span and two-span system, respectively, where in both cases a standard SMF was assumed. Here too the various curves correspond to different values of the LO power, and CD was compensated after signal reconstruction.

Figure 5:
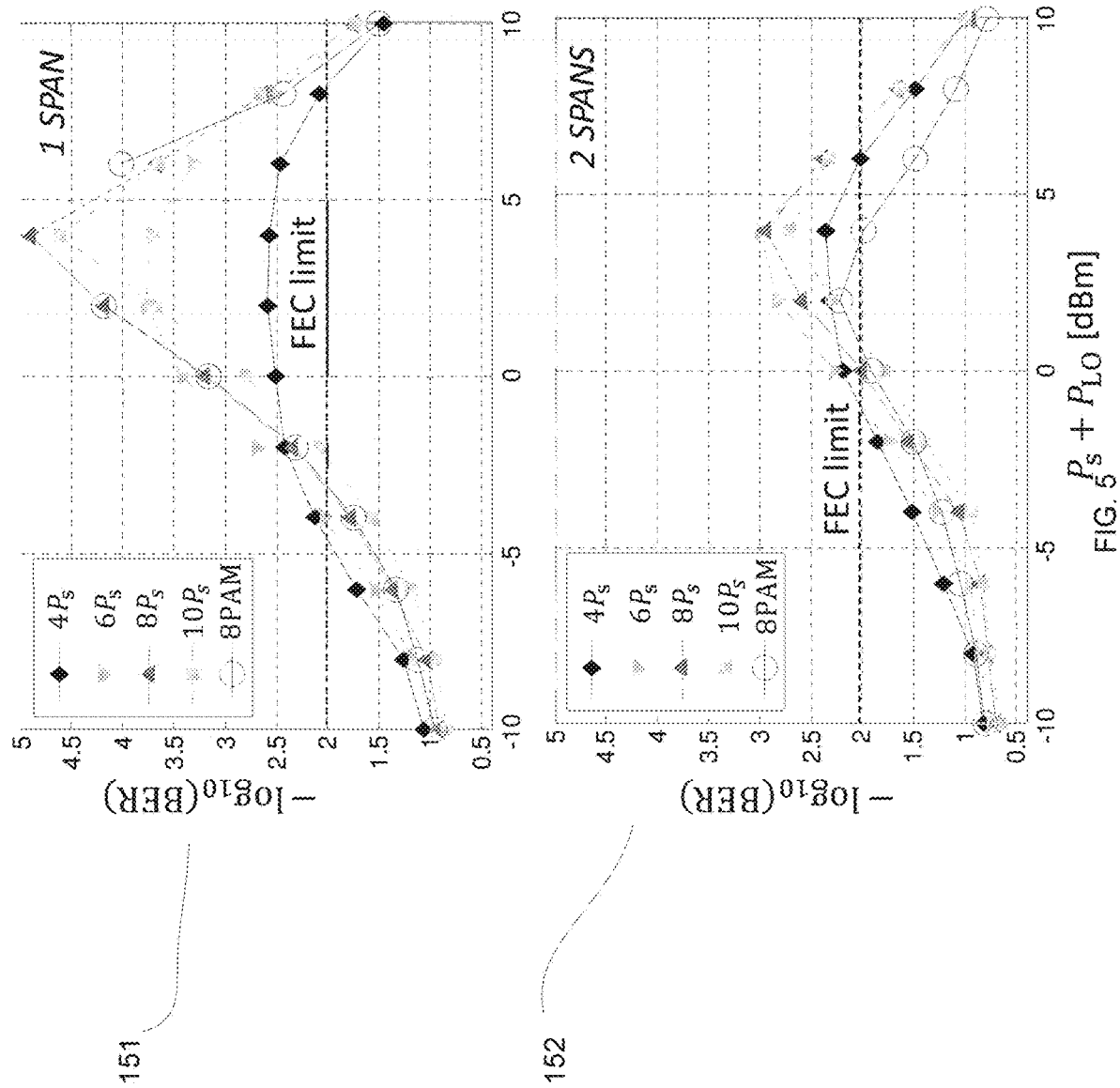
FIG. 5 illustrates BER versus total transmit power according to at least one embodiment of the invention.

As can be seen in the FIG. 5, the FEC threshold of $1.5 \times 10^{-2}$ is exceeded for a broad range of power levels. As expected, the BER improves with the launched power, until it reaches an optimal value, after which it increases as a result of growing nonlinear distortions. The effect of the local oscillator power is dual. On the one hand, it improves the compliance with the Kramers-Kronig condition, which is beneficial for the BER. But on the other hand, it enhances the nonlinear distortion, whose effect on the BER is adverse.

For this reason, the dependence of the peak BER on the LO power is not monotonic. In the example of FIG. 5, the peak BER reduces by increasing the LO power from 6 dB ($P_{LO}=4P_{ch}$) to 9 dB, and then it increases when the LO power is raised beyond nine times the average power of the data-carrying signal. In parallel, the range of channel powers for which the FEC requirement is satisfied shrinks fairly monotonically with increasing LO power.

For comparison, we show in the same figure the BER of an 8 PAM system operated at the baudrate of 32 Gbaud, so as to provide the same throughput. In this case the channel spacing was set to 50 GHz, and optical CD compensation was implemented at the receiver. The fundamental waveform used was the same as in the case of 16 QAM modulation and eight equally spaced amplitude (not intensity) levels were used to encode the information. The figure shows that 8 PAM modulation (at least the idealized implementation that we simulated in this work) over-performs 16 QAM in terms of optimum BER in the single-span configuration, but no substantial difference is visible in the two-span configuration. We remind that the reduced performance of 16 QAM comes with a smaller spectral occupancy.

Referring again to FIG. 5—that illustrates the BER versus total transmit power for the channel of interest of a DWDM system with five transmitted channels. The filled markers were obtained for 16 QAM modulation based on the use of the Kramers-Kronig scheme with various levels of the local oscillator power; the empty circles show the results obtained for 8 PAM modulation. In the Kramers-Kronig scheme CD was compensated after signal reconstruction, whereas in the case of 8 PAM CD was compensated optically. Top and bottom panels differ by the number of spans.

FIG. 6 illustrates a Kramers-Kronig receiver that includes a photodiode 21, analog to digital converter 30, an up-sampling module 41, a logarithm calculation module 42, a Hilbert transform processor 43 and a down-sampling module 44.

FIG. 6 also illustrates various signals such CW signal 11 and modulated signal 12, received signal Es 51, photocurrent I(t) 52, digital representation I(n/EB) 53 of the photocurrent (outputted by analog to digital converted 30), up-sampled digital signal 54 (outputted by up-sampling module 41), a Hilbert transformed signal Es(n/2 mb) 55 (outputted by Hilbert transform processor 43) and a down-sampled Hilbert transformed signal Es(n/2 b) 56 (outputted by down-sampling module 44).

Extensions of the Kramers Kronig Receiver that Accommodate Polarization Multiplexing There may be provided at least one extension of the Kramers-Kronig-receiver that are compatible with polarization multiplexed transmission.

In the case of the first extension, the scheme of FIG. 1A can be combined with polarization multiplexing provided that the receiver is equipped with a device that allows it to separate the two orthogonal polarizations that were multiplexed at the transmitter. This operation can be implemented by means of a controllable polarization rotator followed by a Polarizing Beam Splitter (PBS). The controllable rotator will rotate the incoming signal's polarization until the average powers at the two ports of the PBS are equalized. When the powers at the two PBS outputs are equal, the CW component is equally present in both outputs and each of the outputs of the PBS can be processed by a separate (scalar) KK-receiver.

Since the bandwidth of the photocurrent I is twice larger than the bandwidth of the information carrying optical signal, the minimum sampling rate that is required according to Shannon Nyquist sampling theorem is 2 B. The doubling of the bandwidth is consistent with the fact that the information that was previously encoded in a complex-valued signal, is transferred by square-law detection into a real-valued signal without loss. The photocurrent samples are up-sampled and then the natural logarithm operation is performed. The up-sampling is required so as to accommodate the increase in bandwidth caused by the logarithm operation. Subsequently, a Hilbert transform is applied so as to obtain the phase $\varphi_E$ and the complex signal $E_S(t)$, according to Equations (3) and (4). At this stage, the signal $E_S(t)$ can be down-sampled to the original sampling rate. The subsequent digital processing of the received signal is identical to the one that is found in standard coherent receivers, and is not detailed in the figure.

In the case of the second extension, a complex-valued polarization multiplexed signal 18 is transmitted through the fiber 210 along with a carrier (CW signal 202) aligned with the low-frequency edge of the data-carrying signal (first modulated signal 201) in one of the two polarizations (see FIG. 7A).

The detection in this scheme is performed with the help of a Stokes receiver 220 which uses an optical hybrid. The advantages of the Kramers-Kronig-Stokes receiver relative to standard coherent receptions are: (1) It avoids the need for a local oscillator (2) It uses a simpler optical hybrid (3) It requires only three (instead of four) analog to digital converters (ADCs).

The third implementation of the polarization multiplexed Kramers-Kronig receiver that we present, requires a local oscillator, but the detection itself is implemented with a single pair of photo-diodes (one per polarization), completely avoiding the need for interferometric accuracy in the optical front-end (FIG. 7B). Correspondingly, it requires only two ADCs.

The Kramers-Kronig-Stokes Polarization Multiplexed Receiver

In order to explain the principle of operation of the Kramers-Kronig-Stokes receiver we start from describing the reconstruction of the complex envelopes of the two polarization channels in a back-to-back configuration. Namely, assuming that the modulated polarization channels are x and y and that there is no rotation between the transmitter and receiver (so that the x and y directions are easily identified by it). Subsequently we will explain what happens when the receiver is far from the transmitter and the x and y directions of the transmitter are not known to it.

In FIG. 7A the polarization multiplexed signal 18 includes second modulated signal 203 and first modulated signal 201. In FIG. 7A the second modulated signal 203 has a second polarization, the CW signal 202 and the first modulated signal 201 have a first polarization (for example—x-polarization) that differs from the second polarization (for example y-polarization).

The transmitted fields are $$E_x(t) = Ae^{i\pi Bt} + a_x(t) \quad (8)$$

$$E_y(t) = a_y(t) \quad (9)$$

Where $a_x(t)$ and $a_y(t)$ are the complex envelopes of the two information carrying signals 201 and 203, whose spectral width is B. The term A represents the complex amplitude of a carrier tone transmitted at the frequency $-B/2$ together with the x-polarized channel. The Stokes receiver 220 reproduces the instantaneous Stokes vector of the field, which is given by the three Stokes receiver output signals S1 231, S2 232 and S3 233.

$$S1 = |Ex|^2 - |Ey|^2 \quad (10)$$

$$S2 = 2Re(Ex^*Ey) \quad (11)$$

$$S3 = -2Im(Ex^*Ey). \quad (12)$$

The signal $|Ex|^2$ is extracted from the relation $|Ex|^2 = 0.5*(S0+S1)$, where $S0 = |Ex|^2 + |Ey|^2$ and the field $Ex(t)$ is subsequently extracted using the Kramers-Kronig reconstruction method described above. Once $Ex(t)$ is known, $Ey(t)$ is extracted from the relation:

$$\tilde{E}_y(t) = \frac{S_2 - iS_3}{2\tilde{E}_x^*(t)}, \quad (13)$$

Where the tilde is used to indicate that Ex and Ey denote the reconstructed fields. When the minimum-phase condition is fulfilled, the reconstruction is perfect and $\tilde{E}x,y = Ex,y$. Notice that the Kramers-Kronig-procedure, through which $\tilde{E}x(t)$ is reconstructed implies that its amplitude never crosses zero and hence the division in Equation (13) can be performed with no problem, as we demonstrate in the Section below. Note that when the data carrying signals $a_x$ and $a_y$ have a zero mean and the same average power, the time averaged Stokes vector is given by $\vec{S}_T = (|A|^2, 0, 0)^T$, where by the superscript T we denote "transpose". This property will be used in what follows.

When the receiver and the transmitter are not adjacent to each other, the signal undergoes random polarization rotations while propagating in the fiber. In this case, the field extraction procedure can be carried out as described earlier, provided that the S1 direction coincides with the orientation of the time-average of the received Stokes vector.

We will denote this time averaged vector by $\vec{S}_{TA}$. The procedure of field reconstruction is carried out as follows. First, one generates a rotation matrix $M_R$ such that only the first component of $M_R \vec{S}_{TA}$ is non-zero. Then, after this rotation is applied to the received instantaneous Stokes vector $\vec{S}(t)$, $E_x$ and $E_y$ can be extracted as in the back to back case. It should be noted that the matrix $M_R$ is not unique, as the S2 and S3 directions can be arbitrarily chosen in the plane orthogonal to the S1 direction. This arbitrariness merely translates into a constant phase uncertainty in the recovered $E_y$, which is eliminated by a standard phase recovery algorithm. An interesting consequence of the Kramers-Kronig-Stokes procedure is that it intrinsically identifies the polarizations of the data carrying channels and hence it does not require a MIMO algorithm for polarization demultiplexing.

In general, an ideal implementation of the Kramers-Kronig-Stokes receiver (with perfectly square filters and with the minimum phase condition satisfied) does not incur any noise penalty with respect to a coherent receiver.

We note that as long as the minimum-phase condition is satisfied, the described procedure is not affected in any way by the presence of chromatic, or polarization mode dispersion.

These phenomena merely imply that the reconstructed fields $a_x(t)$ and $a_y(t)$ are distorted versions of the waveforms that were produced by the transmitter. These distortions are not different from those existing in coherent transmission schemes and they are to be treated accordingly.

S1, S2 and S3 are fed to three ADCs 251, 242 and 243 respectively that generate digital representations of S1, S2 and S3 that are fed to digital processor 244. The ADCs and the digital processor are collectively denoted ADC DSP 240. ADC DSP 240 may apply the Kramers-Kronig algorithm, as well as the functionalities of a coherent receiver's digital processor.

ADC DSP 240 may perform the following:
a. Find the time averages values of S1, S2, and S3 which together form a time averaged Stokes vector $\vec{S}_{TA}$.
b. Find a rotation matrix $M_R$ (which is real valued symmetric matrix with orthogonal columns) such that $M_R \vec{S}_{TA}$ is a vector whose second and third components are zeros).
c. Apply the matrix $M_R$ to the Stokes vector $\vec{S}(t)$ (whose components are $S_1(t)$ $S_2(t)$ and $S_3(t)$) such that a rotated Stokes vector $\vec{S}_R(t) = M_R \vec{S}(t)$ is formed. The three components of $\vec{S}_R(t)$ are denoted by $S_{R,1}(t)$, $S_{R,2}(t)$, and $S_{R,3}(t)$.
d. Define $S_0 = |\vec{S}_R| = \sqrt{S_{R,1}^2 + S_{R,2}^2 + S_{R,3}^2}$.
e. Define $I(t) = \frac{1}{2}(S_0 + S_{R,1})$
f. Apply a Kramers-Kronig algorithm (in one of its above listed versions) to I(t) in order to extract $E_x(t)$. This relies on the steps
  i. Define $\phi_{rec}(t) = \frac{1}{2}\text{Hilbert}\{\log[I(t)]\}$, where the digital implementation of this stage may imply the need for up-sampling.
  ii. Extract $E_x(t)$ from $E_x(t) = \sqrt{I(t)}e^{i\phi_{rec}(t)}$, where A may be estimated as the time average of $\sqrt{I(t)}e^{i\phi_{rec}(t)}$.
  iii. Extract $E_y(t)$ from the relation $E_y(t) = (S_{R,2} - iS_{R,3})/E_x$.
g. Perform additional operations such as phase recovery, chromatic dispersion compensation, and possibly nonlinear distortion compensation.

Kramers-Kronig Polarization Multiplexing with Two Photo-Diodes

In this scheme, a local oscillator is used by the receiver. The use of a local oscillator does not necessarily require a dedicated laser, as the signal generated by the transmitter's laser may be split in order to accommodate both functionalities.

As illustrated in FIG. 7B, the received signal and the local oscillator are mixed so that the signals that are photo-detected along the x and y polarization components are $$E_x(t) = Ae^{i\pi Bt} + a_x(t) \quad (7)$$

$$E_y(t) = Ae^{i\pi Bt} + a_y(t) \quad (8)$$

Where in this case $a_x(t)$ and $a_y(t)$ represent the x and y polarization components of the incoming optical signal. Provided that A is large enough in order to fulfill the minimum phase condition, the signals $E_x(t)$ and $E_y(t)$ are both minimum phase, in which case $a_x(t)$ and $a_y(t)$ can be extracted from the respective intensities $|E_x|^2$ and $|E_y|^2$. The extraction of the transmitted data from $a_x(t)$ and $a_y(t)$ relies on the standard digital processing used in generic coherent transmission.

FIG. 7B illustrates a polarization multiplexed signal 17 that includes second modulated signal 203 and first modulated signal 201. In FIG. 7B the second modulated signal 203 has a second polarization, the first modulated signal 201 has a first polarization (for example—x-polarization) that differs from the second polarization (for example y-polarization).

The polarization multiplexed signal 17 is fed to a polarization demultiplexing circuit 270 (includes polarizing beam splitter (PBS) 212) that is configured to receive polarization-multiplexed signal 17 and to output a first polarization component of the polarization-multiplexed signal to first coupler 281 and a second polarization component of the polarization-multiplexed signal to second coupler 282.

The first coupler 281 and the second coupler 282 also receive a CW signal from polarizing beam splitter PBS 216. PBS 216 is fed by local oscillator 214.

Each one of the first and second couplers adds the CW signal to the polarization components they receive and provides a first intermediate signal to the first photodiode 251 and a second intermediate signal to the second photodiode, respectively.

First photodiode 251 is configured to receive the first intermediate signal and output a first photocurrent that represents the first intermediate signal.

Second photodiode 252 is configured to receive the second intermediate signal and output a second photocurrent that represents the second intermediate signal.

There may or may not be a frequency gap between the continuous wave and each one of the first and second intermediate signals. The frequency gap is to facilitate signal reconstruction and may be smaller than the bandwidth of the first modulated signal and the bandwidth of the second modulated signal. The frequency gap may be any fraction of the bandwidth of any one of the first and second modulated signals—for example smaller than one half of the bandwidth of any one of the first and second modulated signals.

First and second photodiodes may be followed by ADC DSP 260.

ADC DSP 260 may include (i) first ADC 261 that is configured to generate a digital representation of the first photocurrent; (ii) second ADC 262 that is configured to generate a digital representation of the second photocurrent; (ii) a digital processor 264 that is configured to: (i) process the digital representation of the first photocurrent to provide a reconstructed phase of the first input signal and a reconstructed complex amplitude of the first input signal, wherein the processing is based on the Kramers-Kronig relationship related to the first polarization component; and (ii) process the digital representation of the second photocurrent to provide a reconstructed phase of the second input signal and a reconstructed amplitude of the second input signal, wherein the processing is based on the Kramers-Kronig relationship related to the second polarization component.

For each one of the two paths, the digital processor may perform the following operations:
  i. Up-sample the digital representation of the photocurrent $I_n(t)$
  ii. Calculate a reconstructed phase $\phi_{E,n}(t) = 0.5 * \text{Hilbert}\{\log(I_n(t))\}$.
  iii. Calculate a reconstructed modulated signal $E_{s,n}(t) = \sqrt{I(t)} e^{i\phi_{E,n}(t)} - E_{0,n}$, where $E_{0,n}$ is the complex envelope of the CW signal, which may be evaluated as the time average $\overline{\sqrt{I(t)} e^{i\phi_{E,n}(t)}}$
  iv. Perform coherent processing steps.
  In steps i-iv the subscript n is either 1 or 2 (or x or y), depending on the path to which it refers.

Considerations concerning the requirements on the local oscillator's power as well as the effect of fiber dispersion and nonlinearities are presented in the Section below.

A hidden assumption that was made for the simplicity of illustration is that the LOs in the x and y polarizations have the same phase (its complex amplitude is denoted by $E_0$ in step iii above). In practice, the phases may differ, as the optical paths of the two polarization components of the LO and the data carrying signal are not identical after polarization splitting.

This is not an issue that impedes the implementation of the scheme, as this phase difference is standardly eliminated digitally in a MIMO demultiplexing algorithm, of the kind used in all coherent receivers.

As in the Kramers-Kronig-Stokes scheme, the operating principle of the receiver path of FIG. 7B (also referred to as the two photodiode (2 PD) approach) is not undermined by the presence of noise or propagation distortions.

Numerical Validation

In order to validate the proposed schemes, we simulated a 100 km link implemented over standard single-mode fiber (dispersion coefficient D=17 ps/nm/km, and nonlinearity coefficient $\gamma=1.3$ $W^{-1}km^{-1}$, loss of 0.2 dB per km, and negligible polarization mode dispersion and polarization dependent loss). The system is assumed to operate at 32 Gbaud with 16-QAM modulation and raised cosine pulses with a roll-off factor of 0.05. We assume 11 WDM channels separated by 50 GHz and evaluate the performance of the central channel. Each simulation was performed with $2^{15}$ symbols and 50 such simulations are performed for every displayed BER point. In all cases, the BER is evaluated under the assumption of Grey coding. In both of the examined schemes we use a 12-th order super-Gaussian optical filter whose 3-dB bandwidth was 48 GHz.

We set the central frequency of the filter to be 5.3 GHz higher than the center frequency of the channels (i.e. it is higher by 22.1 GHz than the frequency of the carrier in the x polarization). All simulations rely on the split-step solution of the Manakov equation and are performed without polarization mode dispersion. A random rotation of the polarization state prior to reception is applied in all cases.

A. Validating the Kramers-Kronig-Stokes Scheme

Figure 8:
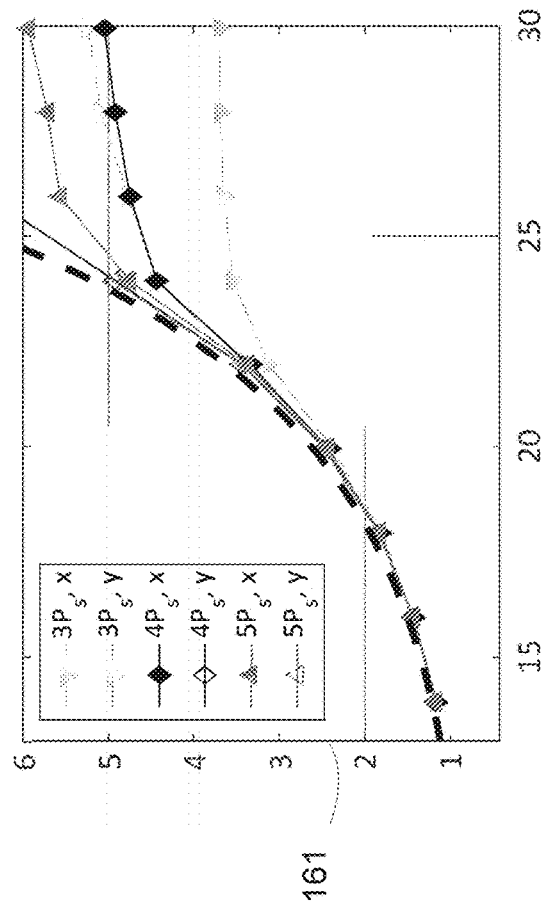
FIG. 8 illustrates a BER versus OSNR according to at least one embodiment of the invention.
Figure 8:
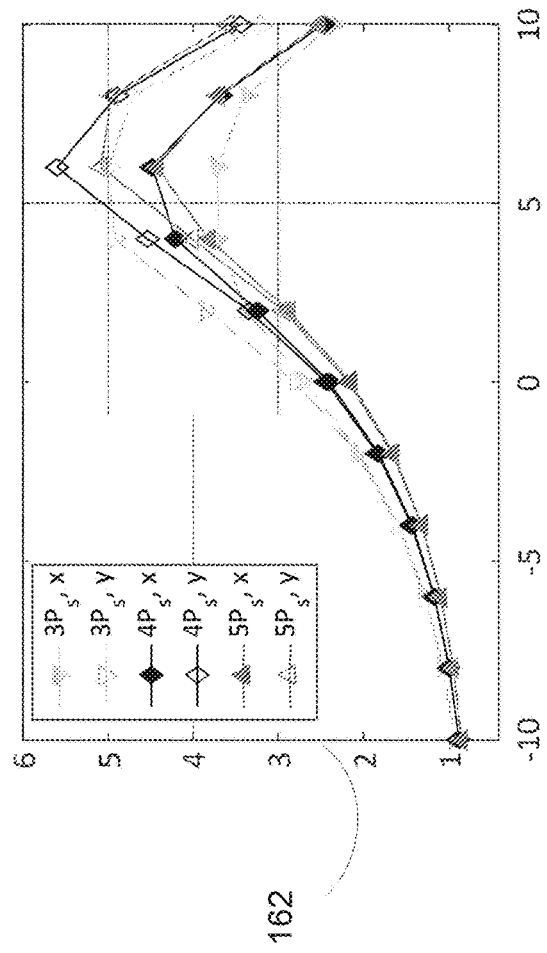

FIG. 8 shows the results obtained with the Kramers-Kronig-Stokes scheme.

The upper panel 161 of FIG. 8 illustrates the BER as a function of the equivalent OSNR, in the regime linear propagation. The filled and empty markers refer to the x- and y-polarized channels, respectively. The results are shown in the cases where the power $|A^2|$ of the CW tone is 3 Ps, 4 Ps, and 5 Ps, where $P_S$ is the total power of the data-carrying signal (in both polarizations). The dashed curve corresponds to the case of an ideal coherent receiver. (b) The BER versus the total transmitted power in a 100 km SMF link. See main text for details. Sudden interruption of a BER curve is due to absence of errors in the recovery of the simulated 215 symbol sequence.

The upper panel 161 of FIG. 8 ignores the effects of nonlinearity by setting $\gamma$ to 0, and show the BER as a function of the equivalent OSNR, which is the OSNR that would characterize an equivalent system using a coherent receiver. Namely, the equivalent OSNR is the total signal power (without the CW tone) divided by the noise power in a bandwidth of 0.1 nm. The results are shown for the cases where the carrier power $|A|^2$ is equal to 3, 4, and 5 times the total power of the signal. The filled and the empty markers correspond to the x and y polarization channels, respectively, and the dashed line shows the result corresponding to an ideal coherent receiver. As is obvious in the figure, at sufficiently high OSNR, the BER saturates. Two observations can be readily made.

One is that the BER of the x-polarized channel always saturates earlier than that of the y-polarized channel. The second is that the stronger $|A|^2$, the higher is the SNR at which the saturation occurs. The explanation for the latter phenomenon is that errors can be caused by noise, or by incorrect reconstruction as a result of the fact that the minimum-phase condition may be violated. The errors observed in the low OSNR case are caused by noise, but when the OSNR increases to the point where noise-induced errors become rarer than the errors caused by incorrect reconstruction, the BER saturates. As the probability of reconstruction errors reduces with the intensity of the carrier, the saturation occurs at higher OSNR values when $|A|^2$ is increased.

The reason for the fact that the y polarized channel saturates later than its x-polarized counterpart is a little subtler and can be explained as follows.

Denoting the reconstruction error of the x-polarized field by e(t), so that $\tilde{E}_x(t)=E_x(t)+\varepsilon(t)$, Equation (13) can be expressed as:

$$\tilde{E}_y = \frac{1}{2}\frac{S_2 - iS_3}{E_x^* + \varepsilon^*} \simeq E_y - \frac{E_y}{E_x^*}\varepsilon^*. \quad (14)$$

Implying that the variance of the reconstruction error of Ey(t) is smaller than that of Ex by a factor of $1+2|A|^2/Ps$ with $Ps=E[|ax|^2+|ay|^2]$ denoting the average power of the data carrying signal. Note that in all cases, the saturation occurs at BER levels well below the relevant threshold level of $10^{-2}$ and hence the scheme can be safely operated with even with $|A|^2=3$ Ps, implying that the total launched power with the Kramers-Kronig-Stokes scheme is 6 dB higher than in the coherent case.

In order to examine the effect of nonlinearity, we show in the lower panel 162 of FIG. 8 the BER as a function of the launched power per WDM channel (in both polarizations, i.e. Ps+$|A|^2$). Once again, the y polarization performs better than x, which in this case results both from the reduced reconstruction error and from the fact that the nonlinear effect of the carrier is stronger in the case of the x-polarized channel, which is parallel to it. Nonetheless, when $|A|^2=3$ Ps the saturation in the case of the x polarization is dominated by reconstruction errors, as can be seen from the fact that the BER is almost identical to its value in the linear case, and is safely lower than typical FEC thresholds. This suggests once again, that the setting $|A|^2=3$ Ps is adequate for a well operating Kramers-Kronig-Stokes receiver.

B. Validating the Two Photo-Diode Scheme

Figure 10:
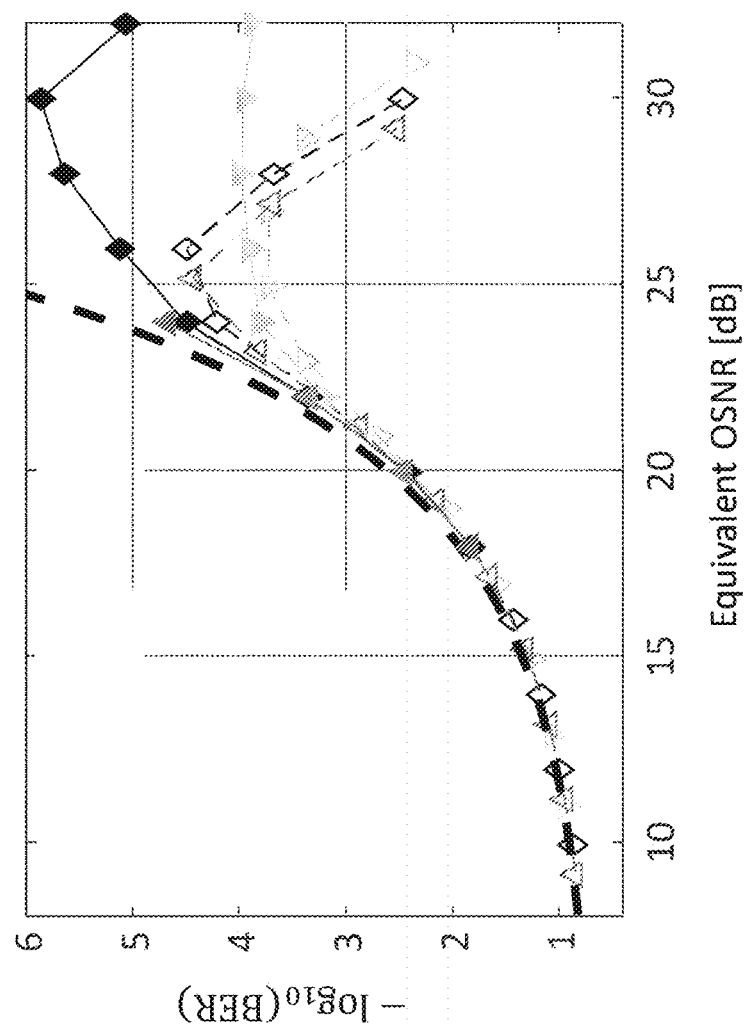
FIG. 10 illustrates a BER versus OSNR according to at least one embodiment of the invention.

FIGS. 9A and 9B show (panels 171 and 172) the BER in the two photo-diode configurations. FIGS. 9A and 9B correspond to the case of linear and nonlinear transmission. Owing to the symmetry of the scheme, the two polarization channels perform identically, and their performance is identical to that of the x-polarized channel in the Kramers-Kronig-Stokes implementation. In order for the comparison in the nonlinear case to be meaningful, we plot in FIG. 10 (panel 181) the BER as a function of the equivalent OSNR (which is identical to the actual OSNR in the 2 PD case) for the x-polarized channels in the two receiver schemes. This time the empty markers correspond to the Kramers-Kronig-Stokes receiver, whereas the filled markers correspond to the Kramers-Kronig-2 PD scheme. As is evident from the figure, the Kramers-Kronig-2 PD scheme is more tolerant to the fiber nonlinearity, owing to the smaller total launch power. Moreover, as the power of the CW signal is increased (approximately above the value of 10 Ps), the performance of the Kramers-Kronig-2 PD scheme approaches that of coherent homodyne, since the increased CW signal power improves the signal reconstruction quality without affecting the magnitude of the propagation-induced nonlinear distortion Discussion Both presented approaches for extending the Kramers-Kronig-scheme to accommodate polarization multiplexed transmission were shown to produce promising results, with error-rates well below the frequently quoted 0.01 FEC threshold. For adequate performance, the power that needs to be allocated for the carrier (the local oscillator) is of the order of 3 Ps and 6 Ps in the Kramers-Kronig-Stokes and the 2 PD scheme, respectively. The disadvantage of requiring a LO signal in the latter case is not significant, given that it can be extracted from the transmission laser. On the other hand, the fact that the 2 PD scheme involves only two ADCs and does not require an optical hybrid implies a notable reduction in cost.

As was pointed out above, the Kramers-Kronig-Stokes procedure does not require a MIMO algorithm for polarization demultiplexing. On the other hand, the existence of different performance for the two polarization channels may be considered a disadvantage.

A simple modification that remedies this is one where the carrier's state of polarization is set to be at 45 degrees between the x and y polarizations. In this case, half of the carrier power accompanies each one of the two polarization channels, and the Kramers-Kronig-receiver reconstructs the field components polarized at _45 degrees. With this modification, the performance of the two polarization channels is equalized, but the implementation of a MIMO algorithm for polarization demultiplexing can no longer be avoided (as in the coherent or Kramers-Kronig-2 PD cases).

The configuration illustrated in FIGS. 7A and 7B may be regarded as an extension to the configuration of FIGS. 1A and 1B, the extensions accommodate for polarization multiplexed transmission. The first scheme combines a Stokes receiver with Kramers-Kronig-processing, and requires the transmission of a CW tone together with one of the polarization channels. The second scheme uses only two photodiodes for detection, one per polarization, and does not require the transmission of a CW tone. On the other hand, it relies on the availability of a local oscillator. We demonstrated the performance of the two schemes for transmission settings inspired by the needs of inter-data center communications.

Figure 11:
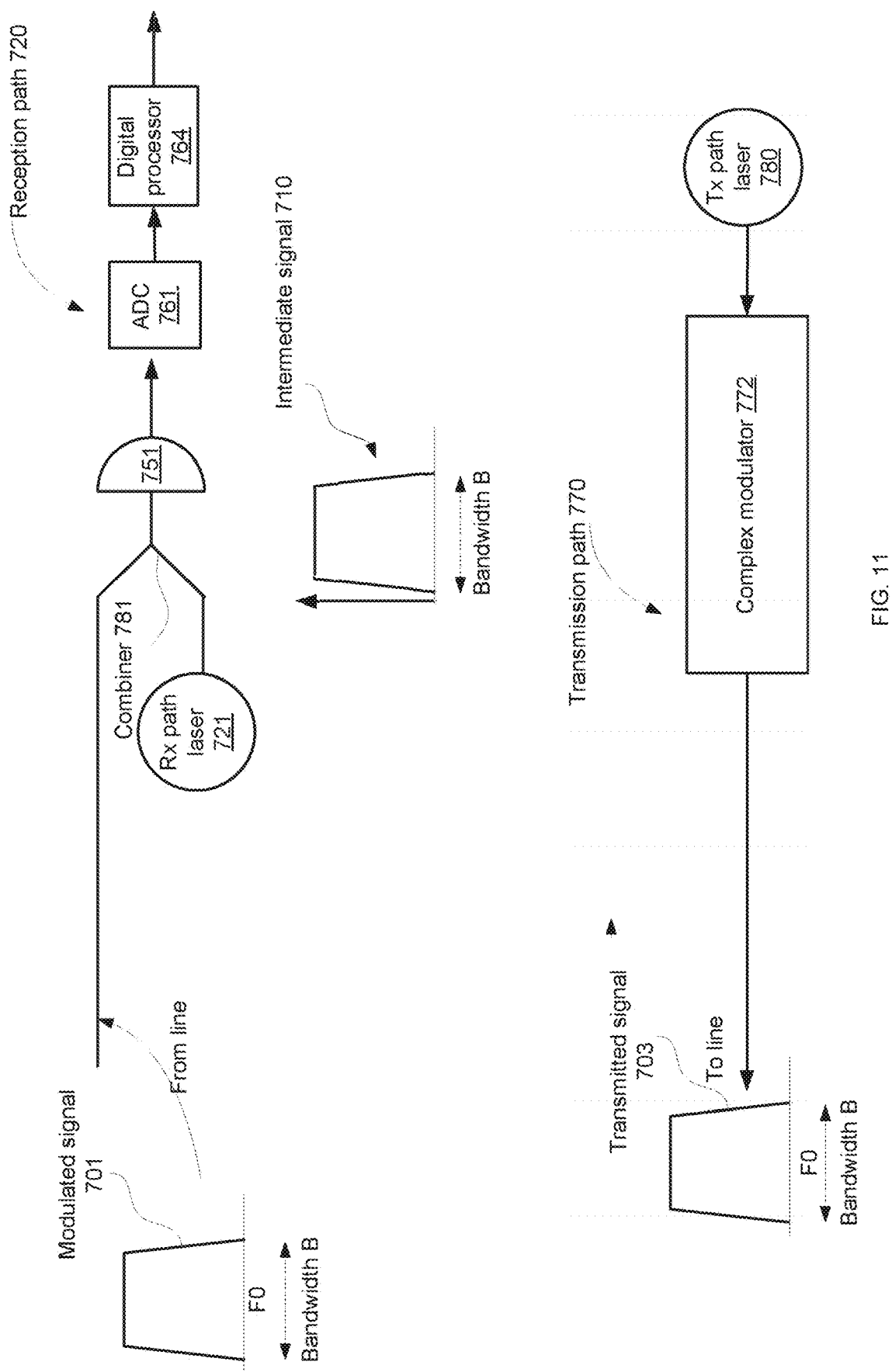
FIG. 11 illustrates a transceiver according to at least one embodiment of the invention.

FIG. 11 illustrates a transceiver that includes a reception path 720 and a transmission path 770.

The reception path 720 includes a receiver (Rx) path laser 721, a combiner 781 for adding the CW signal from the Rx path laser 721 to a received signal (such as modulated signal 701) to provide intermediate signal 710, a photodiode 751 that outputs a photocurrent that represents the modulated signal 701, an ADC 761 that performs an analog to digital conversion of the photocurrent and a digital processor 764 that may process the digital signal from the ADC based on the Kramers-Kronig relationship related to the modulated signal. The reception path 720 may include any of the components illustrated, for example, in FIG. 1B.

The transmission path 770 includes a transmission (Tx) path laser 780 that is followed by a complex modulator 772 that outputs transmitted signal 703.

The received signal 701 has a bandwidth B and a central frequency F0. The intermediate signal includes a CW signal (provided by Rx path laser 721) that has a frequency that does not exceed F0-B/2—in order to be positioned to the left of the received signal 701.

The transmitted signal 703 a bandwidth B and a central frequency F0. Accordingly—the CW signal provided by Tx path laser 780 has a frequency of F0.

The different frequencies of the CW signals generated by Rx path laser 721 and Tx path laser 780 requires using two separate lasers.

Figure 12:
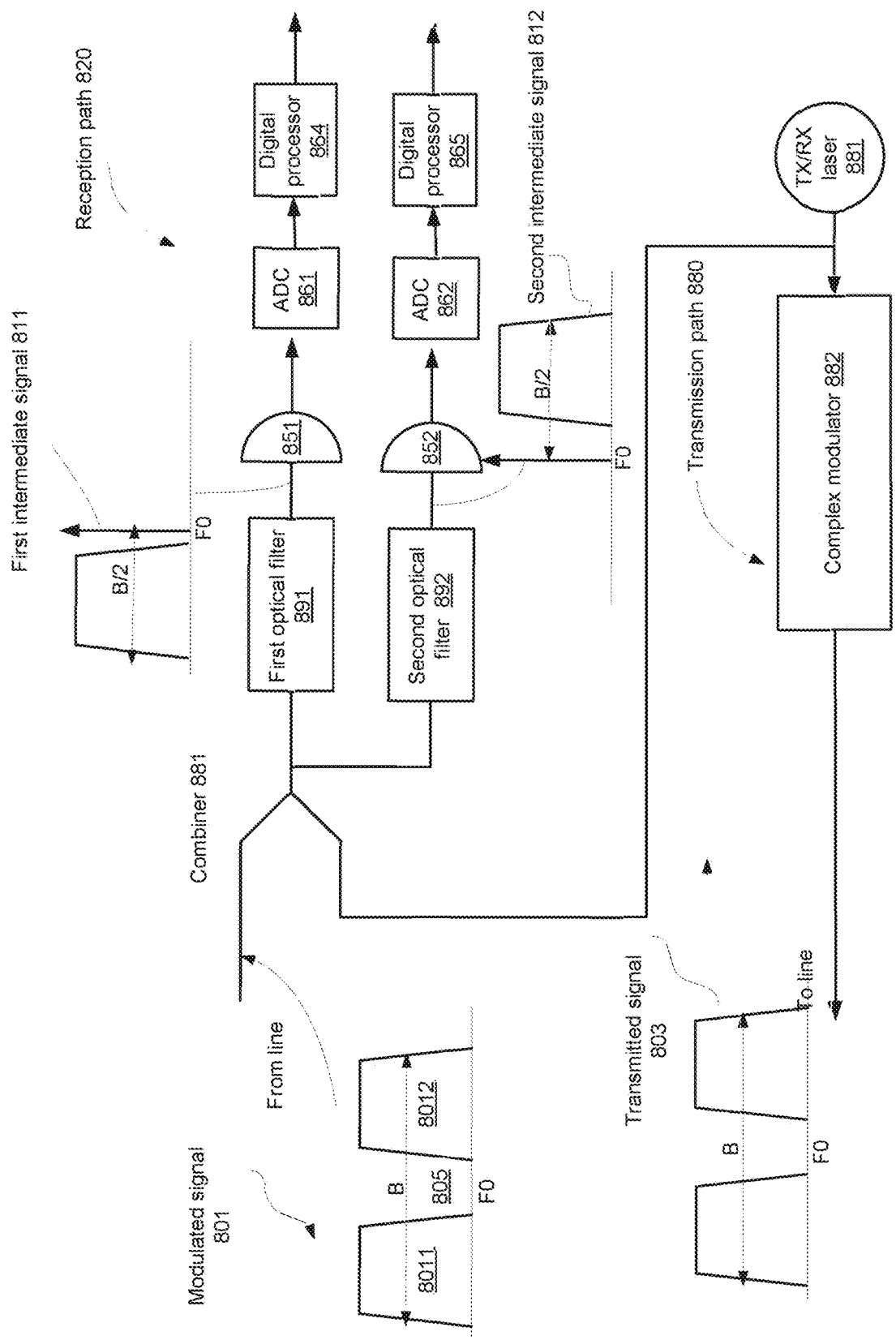
FIG. 12 illustrates a transceiver according to at least one embodiment of the invention.

FIG. 12 illustrates a transceiver that includes a reception path 820 and a transmission path 880.

This transceiver includes a single laser—TX/RX laser 881.

TX/RX laser 881 generates a CW signal (at frequency F0) that is fed to (a) the complex modulator 882 of the transmission path 880, and to the reception path 820.

The reception path 820 include a combiner 881 that combines the CW signal from the TX/RX laser 881 and a modulated signal 801 (from a communication line) to provide a combined signal that is fed to a first optical filter 891 and a second optical filter 892 of the reception path.

The modulated signal 801 includes two sidebands 8011 and 8012 with a guard band 805 in the middle between $\omega=F0-\delta$ and $\omega=F0+\delta$. The value of $\delta$ is anything between 0 and a certain fraction of B (for example B/4), and it may be chosen to have the lowest value that still accommodates separation between the two sidebands 8011 and 8012 by using first optical filter 891 and a second optical filter 892 or any other means of optical filtering.

The first optical filter 891 outputs a first intermediate signal 811 that includes the CW signal from TX/RX laser 881 and sideband 8011.

The second optical filter 892 outputs a second intermediate signal 812 that includes the CW signal from TX/RX laser 881 and sideband 8012.

First photodiode 851 outputs a first photocurrent that represents first intermediate signal 811, first ADC 861 performs an analog to digital conversion of the first photocurrent and first digital processor 864 may process the digital signal from the first ADC based on the Kramers-Kronig relationship related to the modulated signal.

Second photodiode 852 outputs a second photocurrent that represents second intermediate signal 812, second ADC 862 performs an analog to digital conversion of the second photocurrent and second digital processor 865 may process the digital signal from the second ADC based on the Kramers-Kronig relationship related to the modulated signal.

The reception path 820 may include any of the components illustrated, for example, in FIG. 1B.

The bandwidth B can be doubled relative to the implementation in FIG. 11, provided that the corresponding bandwidth can be supported by the transmitter.

The CW signal may be added after the optical filtering, that is, at the output of each one of first optical filter 891 and second optical filter 892. This configuration requires one splitter for the RX/TX laser and two couplers at the output of the first and second optical filters. This configuration allows more flexibility on the design of the optical filters.

Figure 13:
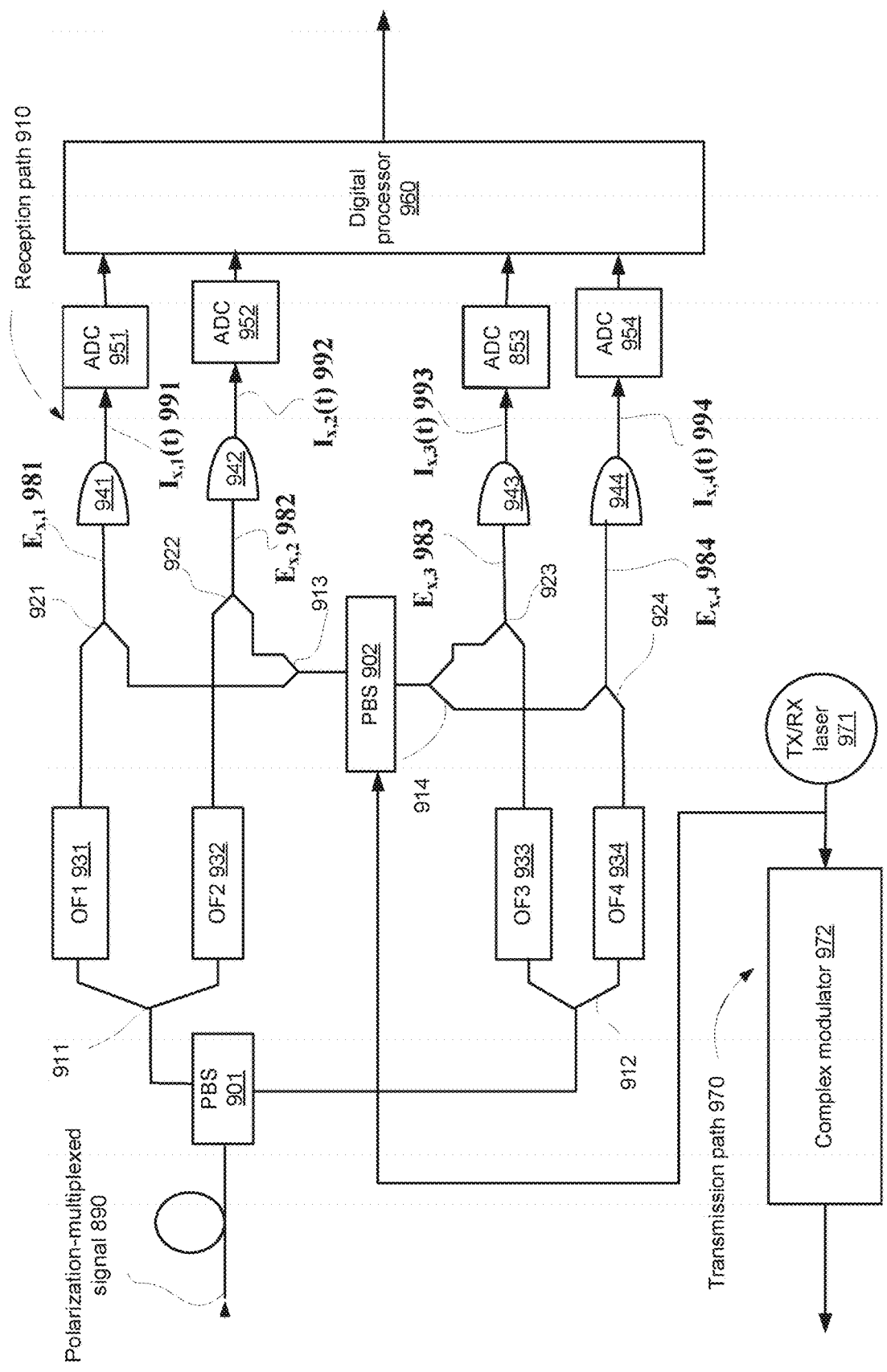
FIG. 13 illustrates a transceiver according to at least one embodiment of the invention.

FIG. 13 illustrates a transceiver according to an embodiment of the invention.

The transceiver of FIG. 13 includes reception path 910 and a transmission path 970.

The transmission path 970 may include TX/RX laser 971 and complex modulator 972.

The reception path 910 includes PBS 901, PBS 902, splitters 911, 912, 913 and 914, combiners 921, 922, 923 and 924, photodiodes 941, 942, 943 and 944, ADCs 951, 952, 953 and 954 and digital processor 960.

A polarization multiplexed signal 890 is received by PBS 901.

The polarization multiplexed signal 890 includes a combination of (a) a first polarized modulated signal that includes two sidebands and with a guard band in the middle between $\omega=F0-\delta$ and $\omega=F0+\delta$ (such as modulated signal 801 of FIG. 12), and of (b) a second polarized modulated signal that includes two sidebands and with a guard band in the middle between $\omega=F0-\delta$ and $\omega=F0+\delta$ (such as modulated signal 801 of FIG. 12).

A first polarization component of the polarization multiplexed signal 890 is sent by PBS 901 to splitter 911 and then to first and second optical filters OF1 931 and OF2 932.

First optical signal OF1 931 outputs a first sideband of the first polarization component of the polarization multiplexed signal 890.

Second optical signal OF2 932 outputs a second sideband of the first polarization component of the polarization multiplexed signal 890.

Combiner 921 combines a first polarization CW signal with the first sideband of the first polarization component of the polarization multiplexed signal 890 to provide a first intermediate signal that has a field $E_{x,1}$ 1891 and is fed to first photodiode 941.

Combiner 922 combines a first polarization CW signal with the second sideband of the first polarization component of the polarization multiplexed signal 890 to provide a second intermediate signal that has a field $E_{x,2}$ 2892 and is fed to second photodiode 942.

First photodiode 941 outputs a first photocurrent $I_{x,1}(t)$ 991 that is analog to digital converted by ADC 951 and is fed to digital processor 960.

Second photodiode 942 outputs a second photocurrent $I_{x,2}(t)$ 992 that is analog to digital converted by ADC 952 and is fed to digital processor 960.

Combiner 923 combines a second polarization CW signal with the first sideband of the second polarization component of the polarization multiplexed signal 890 to provide a third intermediate signal that has a field $E_{x,3}$ 893 and is fed to third photodiode 943.

Combiner 924 combines the second polarization CW signal with the second sideband of the second polarization component of the polarization multiplexed signal 890 to provide a fourth intermediate signal that has a field $E_{x,4}$ 894 and is fed to fourth photodiode 944.

Third photodiode 943 outputs a third photocurrent $I_{x,3}(t)$ 993 that is analog to digital converted by ADC 953 and is fed to digital processor 960.

Fourth photodiode 944 outputs a fourth photocurrent LAO 994 that is analog to digital converted by ADC 954 and is fed to digital processor 960.

Digital processor 960 may process the digital signals from ADCs 951-954 using one or more Kramers-Kronig relationships.

The processing may include
  a. Extracting $E_{x,1}$ from $I_{x,1}$ using a Kramers-Kronig algorithm.
  b. Extracting $E_{x,2}$ from $I_{x,2}$ using the Kramers-Kronig algorithm.

c. Extracting $E_{y,1}$ from $I_{y,1}$ using the Kramers-Kronig algorithm.
d. Extracting $E_{y,2}$ from $I_{y,2}$ using the Kramers-Kronig algorithm.
e. Applying any coherent processing to the vectors $$\begin{bmatrix} E_{x,1} \\ E_{y,1} \end{bmatrix} \text{ and } \begin{bmatrix} E_{x,2} \\ E_{y,2} \end{bmatrix}$$

Figure 14:
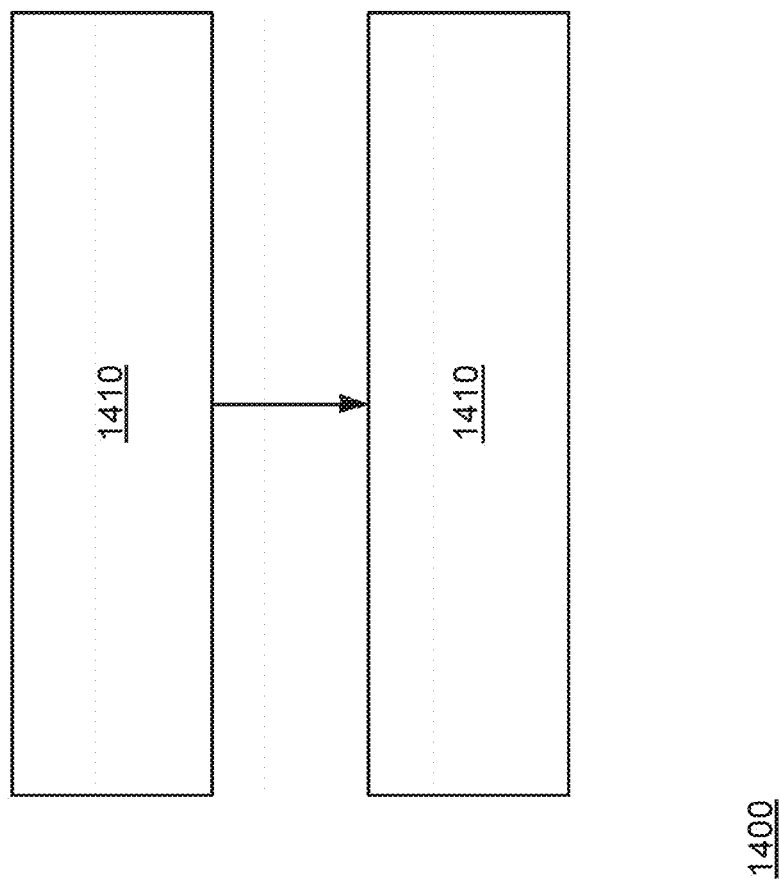
FIG. 14 illustrates a method according to at least one embodiment of the invention.

FIG. 14 illustrates method 1400 according to an embodiment of the invention.

Various steps of method 1400 may be executed by each one of the Kramers-Kronig receivers and/or the Kramers-Kronig transceivers illustrated in any of the figures and/or in the specification.

Method 1400 may include step 1410 of receiving a signal.

Step 1410 may be followed by step 1420 of reconstructing the signal based on at least one Kramers-Kronig relationship related to the signal.

Method 1400 may also include generating a transmitted signal. The generation of the transmitted signal may be related to various Kramers-Kronig transceivers such as those illustrated in FIGS. 11-13.

Method 1400 may include, for example, any combination of the steps mentioned in the summary.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. For example—the computer program may include a list of instructions that causes any of the mentioned above digital processors to perform any of the mentioned above processing.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units, or devices, for example via intermediate devices. Accordingly, unless implied or stated otherwise, the connections may for example be direct connections or indirect connections. The connections may be illustrated or described about being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A Kramers-Kronig receiver, comprising a reception path; wherein the reception path comprises: a Stokes receiver that is configured to receive a polarization-multiplexed signal and to output a Stokes vector; wherein the polarization-multiplexed signal comprises a first modulated signal, a second modulated signal and a continuous wave signal; wherein the first modulated signal is of a first polarization; wherein the second modulated signal is of a second polarization; wherein the continuous wave signal is of the first modulation or of the second modulation; a set of analog to digital converters that are configured to generate a digital representation of the Stokes vector; and a digital processor that is configured to process the digital representation of the Stokes vector to provide a reconstructed polarization-multiplexed signal, wherein the processing is based on a Kramers-Kronig relationship related to the polarization-multiplexed signal.

2. The Kramers-Kronig receiver according to claim 1 wherein the polarization-multiplexed signal has a first polarization field and a second polarization field; wherein the Stokes vector comprises a first Stokes receiver output signal that is indicative of (a) a square of an absolute value of the first polarization field minus (h) a square of an absolute value of the second polarization field.

3. The Kramers-Kronig receiver according to claim 1 wherein the Stokes vector comprises a second Stokes receiver output signal that is indicative of a real part of a given product of a multiplication of the first polarization field by the second polarization field, and a third Stokes receiver output signal that is indicative of an imaginary part of the given product.

4. The Kramers-Kronig receiver according to claim 1 wherein the digital processor is configured to: a. calculate a rotation matrix that once applied to a time averaged Stokes vector provides a rotated vector that has a first non-zero element, a zero valued second element and a zero valued third element; b. apply the rotation matrix on the Stokes vector to provide a rotated Stokes vector; and; c. calculate the reconstructed polarization-multiplexed signal based on the rotated Stokes vector.

5. A Kramers-Kronig transceiver, comprising a reception path and a transmission path and a local oscillator that is configured to generate a continuous wave (CW) signal; wherein the transmission path comprises a complex modulator that is configured to receive the CW signal and is configured to modulate the CW signal to generate a transmitted signal that is transmitted to a communication link; wherein the reception path comprises: a combiner that is configured to add the CW signal with a received signal from the communication link to provide a combined signal; wherein the received signal comprises a first sideband and a second sideband that are spaced apart from each other by a guard band; wherein the CW signal has a frequency that is included in the guard hand; a first optical filter that is configured to filter the combined signal and output a first intermediate signal that comprises the CW signal and the first sideband; a second optical filter that is configured to filter the combined signal and output a second intermediate signal that comprises the CW signal and the second sideband; a first photodiode that is configured to receive the first intermediate signal and output a first photocurrent that represents the first intermediate signal; a second photodiode that is configured to receive the second intermediate signal and output a second photocurrent that represents the second intermediate signal; a first analog to digital converter that is configured to generate a digital representation of the first photocurrent; a second analog to digital converter that is configured to generate a digital representation of the second photocurrent; and a digital processor that is configured to process the digital representation of the first photocurrent and the digital representation of the second photocurrent to provide a reconstructed received signal, wherein the processing is based on a Kramers-Kronig relationship related to the received signal.

6. The Kramers-Kronig receiver according to claim 5, wherein the guard band does not exceed a portion of a bandwidth of the first sideband.

7. A Kramers-Kronig transceiver, comprising a reception path and a transmission path and a local oscillator that is configured to generate a continuous wave (CW) signal; wherein the transmission path comprises a complex modulator that is configured to receive the CW signal and is configured to modulate the CW signal to generate a transmitted signal that is transmitted to a communication link; wherein the reception path comprises: a polarization demultiplexing circuit that is configured to receive a polarization-multiplexed signal and to output a first polarization component of the polarization-multiplexed signal and a second polarization component of the polarization-multiplexed signal; a first optical filter that is configured to filter the first polarization component and output a first sideband of the first polarization component; a second optical filter that is configured to filter the first polarization component and output a second sideband of the first polarization component; wherein the first and second sidebands of the first polarization component are spaced apart from each other by a guard band; a first combiner that is configured to add the CW signal with the first sideband of the first polarization component to provide a first combined signal; a second combiner that is configured to add the CW signal with the second sideband of the first polarization component to provide a second combined signal; a first photodiode that is configured to receive the first combined signal and output a first photocurrent that represents the first combined signal; a second photodiode that is configured to receive the second combined signal and output a second photocurrent that represents the second combined signal; a first analog to digital converter that is configured to generate a digital representation of the first photocurrent; a second analog to digital converter that is configured to generate a digital representation of the second photocurrent; a third optical filter that is configured to filter the second polarization component and output a first sideband of the second polarization component; a fourth optical filter that is configured to filter the second polarization component and output a second sideband of the second polarization component; wherein the first and second sidebands of the second polarization component are spaced apart from each other by the guard band; a third combiner that is configured to add the CW signal with the first sideband of the second polarization component to provide a third combined signal; a fourth combiner that is configured to add the CW signal with the second sideband of the second polarization component to provide a fourth combined signal; a third photodiode that is configured to receive the third combined signal and output a third photocurrent that represents the third combined signal; a fourth photodiode that is configured to receive the fourth combined signal and output a fourth photocurrent that represents the fourth combined signal; a third analog to digital converter that is configured to generate a digital representation of the third photocurrent; a fourth analog to digital converter that is configured to generate a digital representation of the fourth photocurrent; and a digital processor that is configured to process the digital representation of the first photocurrent, the second photocurrent, the third photocurrent and the fourth photocurrent to provide a reconstructed polarization-multiplexed signal, wherein the processing is based on a Kramers-Kronig relationship related to the polarization-multiplexed signal.

8. A method, comprising: receiving, by a Stokes receiver of a reception path of Kramers-Kronig receiver, a polarization-multiplexed signal; outputting by the Stokes receiver, a Stokes vector; wherein the polarization-multiplexed signal comprises a first modulated signal, a second modulated signal and a continuous wave signal; wherein the first modulated signal is of a first polarization; wherein the second modulated signal is of a second polarization; wherein the continuous wave signal is of the first modulation or of the second modulation; performing an analog to digital conversion, by a set of analog to digital converters, of the Stokes vector to provide a digital representation of the Stokes vector; and processing, by a digital processor of the reception path of Kramers-Kronig receiver, the digital representation of the Stokes vector to provide a reconstructed polarization-multiplexed signal, wherein the processing is based on a Kramers-Kronig relationship related to the polarization-multiplexed signal.

9. A method, comprising: generating by a local oscillator a continuous wave (CW) signal; modulating, by a complex modulator, the CW signal to generate a transmitted signal that is transmitted to a communication link; adding, by a combiner of a reception path of Kramers-Kronig receiver, the CW signal with a received signal from the communication link to provide a combined signal; wherein the received signal comprises a first sideband and a second sideband that is spaced apart from each other by a guard band; wherein the CW signal has a frequency that is included in the guard band; filtering, by a first optical filter of the reception path of Kramers-Kronig receiver, the combined signal and output a first intermediate signal that comprises the CW signal and the first sideband; filtering, by a second optical filter of the reception path of Kramers-Kronig receiver, the combined signal and output a second intermediate signal that comprises the CW signal and the second sideband; receiving by a first photodiode of the reception path of Kramers-Kronig receiver the first intermediate signal and outputting a first photocurrent that represents the first intermediate signal; receiving, by a second photodiode of the reception path of Kramers-Kronig receiver, the second intermediate signal and outputting a second photocurrent that represents the second intermediate signal; performing an analog to digital conversion of the first photocurrent, by a first analog to digital converter of the reception path, to generate a digital representation of the first photocurrent; performing an analog to digital conversion of the second photocurrent, by a second analog to digital converter of the reception path, to generate a digital representation of the second photocurrent;

and processing, by a digital processor of the reception path of Kramers-Kronig receiver, the digital representation of the first photocurrent and the digital representation of the second photocurrent to provide a reconstructed received signal, wherein the processing is based on a Kramers-Kronig relationship related to the received signal.

10. A method, comprising: generating by a local oscillator a continuous wave (CW) signal; modulating, by a complex modulator, the CW signal to generate a transmitted signal that is transmitted to a communication link; receiving a polarization-multiplexed signal by a polarization demultiplexing circuit of a reception path of Kramers-Kronig receiver and outputting a first polarization component of the polarization-multiplexed signal and a second polarization component of the polarization-multiplexed signal; filtering, by a first optical filter of the reception path of Kramers-Kronig receiver, the first polarization component and outputting a first sideband of the first polarization component; filtering, by a second optical filter of the reception path of Kramers-Kronig receiver, the first polarization component and outputting a second sideband of the first polarization component; wherein the first and second sidebands of the first polarization component is spaced apart from each other by a guard band; combining, by a first combiner of the reception path of Kramers-Kronig receiver, the CW signal with the first sideband of the first polarization component to provide a first combined signal; combining, by a second combiner of the reception path of Kramers-Kronig receiver the CW signal with the second sideband of the first polarization component to provide a second combined signal; receiving, by a first photodiode of the reception path of Kramers-Kronig receiver, the first combined signal and outputting a first photocurrent that represents the first combined signal; receiving, by a second photodiode of the reception path of Kramers-Kronig receiver, the second combined signal and outputting a second photocurrent that represents the second combined signal; converting, by a first analog to digital converter of the reception path of Kramers-Kronig receiver, the first photocurrent to provide a digital representation of the first photocurrent; converting, by a second analog to digital converter of the reception path of Kramers-Kronig receiver, the second photocurrent to provide a digital representation of the second photocurrent; filtering, by a third optical filter of the reception path of Kramers-Kronig receiver, the second polarization component and outputting a first sideband of the second polarization component; filtering, by a fourth optical filter of the reception path of Kramers-Kronig receiver, the second polarization component and outputting a second sideband of the second polarization component; wherein the first and second sidebands of the second polarization component is spaced apart from each other by a guard band; combining, by a third combiner of the reception path of Kramers-Kronig receiver, the CW signal with the first sideband of the second polarization component to provide a third combined signal; combining, by a fourth combiner of the reception path of Kramers-Kronig receiver the CW signal with the second sideband of the second polarization component to provide a fourth combined signal; receiving, by a third photodiode of the reception path of Kramers-Kronig receiver, the third combined signal and outputting a third photocurrent that represents the third combined signal; receiving, by a fourth photodiode of the reception path of Kramers-Kronig receiver, the fourth combined signal and outputting a fourth photocurrent that represents the fourth combined signal; converting, by a third analog to digital converter of the reception path of Kramers-Kronig receiver, the third photocurrent to provide a digital representation of the third photocurrent; converting, by a fourth analog to digital converter of the reception path of Kramers-Kronig receiver, the fourth photocurrent to provide a digital representation of the fourth photocurrent; and processing, by a digital processor of the reception path the digital representation of the first photocurrent, the second photocurrent, the third photocurrent and the fourth photocurrent to provide a reconstructed polarization-multiplexed signal, wherein the processing is based on a Kramers-Kronig relationship related to the polarization-multiplexed signal.

* * * * *